United States Patent
Nguyen Van

(10) Patent No.: US 10,479,353 B2
(45) Date of Patent: Nov. 19, 2019

(54) VEHICLE SURROUNDING SITUATION ESTIMATION DEVICE

(71) Applicant: TOYOTA JIDOSHA KABUSHIKI KAISHA, Toyota-shi, Aichi-ken (JP)

(72) Inventor: Quy Hung Nguyen Van, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 20 days.

(21) Appl. No.: 15/107,012

(22) PCT Filed: Dec. 12, 2014

(86) PCT No.: PCT/IB2014/002743
§ 371 (c)(1),
(2) Date: Jun. 21, 2016

(87) PCT Pub. No.: WO2015/097511
PCT Pub. Date: Jul. 2, 2015

(65) Prior Publication Data
US 2017/0001637 A1    Jan. 5, 2017

(30) Foreign Application Priority Data

Dec. 26, 2013  (JP) .................................. 2013-270337

(51) Int. Cl.
*B60W 30/09* (2012.01)
*B60W 50/02* (2012.01)
(Continued)

(52) U.S. Cl.
CPC .......... *B60W 30/09* (2013.01); *B60W 50/029* (2013.01); *B60W 50/0225* (2013.01);
(Continued)

(58) Field of Classification Search
CPC .......... B60W 50/0225; B60W 50/029; B60W 30/09; B60W 2030/082;
(Continued)

(56) References Cited

U.S. PATENT DOCUMENTS

2006/0103927 A1* 5/2006 Samukawa ............. G01S 17/42
359/436
2007/0052530 A1* 3/2007 Diebold ................ B60R 21/013
340/467
(Continued)

FOREIGN PATENT DOCUMENTS

CN    103010209 A    4/2013
JP    2007-516127 A    6/2007

*Primary Examiner* — Nga X Nguyen
(74) *Attorney, Agent, or Firm* — Sughrue Mion, PLLC

(57) ABSTRACT

A vehicle surrounding situation estimation device includes a collision detection unit that detects that a vehicle collides with an object outside the vehicle; a surrounding situation detection unit that detects a situation of a detection area around the vehicle; a surrounding situation estimation unit that estimates a situation of a prediction area around the vehicle at a collision time based on a detection result of the surrounding situation detection unit before the collision detection unit detects the collision; a surrounding situation recording unit that records the situation of the prediction area; and a surrounding situation prediction unit that predicts a situation of a vehicle surrounding area around the vehicle based on the situation of the prediction area after the collision detection unit detects the collision, the situation of the prediction area being recorded by the surrounding situation recording unit before the collision detection unit detects the collision.

3 Claims, 14 Drawing Sheets

(51) Int. Cl.
*B60W 50/029* (2012.01)
*G01S 13/93* (2006.01)
*G01S 13/87* (2006.01)
*G01S 7/40* (2006.01)
*B60W 30/08* (2012.01)

(52) U.S. Cl.
CPC ............... *G01S 7/40* (2013.01); *G01S 13/87* (2013.01); *G01S 13/931* (2013.01); *B60W 2030/082* (2013.01); *B60W 2050/0215* (2013.01); *B60W 2520/14* (2013.01); *G01S 2013/9353* (2013.01); *G01S 2013/9375* (2013.01); *G01S 2013/9378* (2013.01); *G01S 2013/9385* (2013.01)

(58) Field of Classification Search
CPC ..... B60W 2050/0215; B60W 2520/14; B60W 50/0205; B60W 50/14; B60W 30/08; B60W 30/02; B60W 30/085; B60W 2040/0881; B60W 2050/146; B60W 2550/10; B60W 2550/408; B60W 2750/40; G01S 13/931; G01S 13/87; G01S 7/40; G01S 2013/9353; G01S 2013/9375; G01S 2013/9378; G01S 2013/9385; B60R 21/00
USPC ......... 701/300–302, 23, 29.7–29.9, 117, 514
See application file for complete search history.

(56) References Cited

U.S. PATENT DOCUMENTS

2010/0010723 A1* 1/2010 Taki ...................... B60W 30/08
            701/102
2013/0261869 A1* 10/2013 Brenneis ........... B60W 50/0205
            701/23

* cited by examiner

VEHICLE SURROUNDING SITUATION ESTIMATION DEVICE

BACKGROUND OF THE INVENTION

1. Field of the Invention

The present invention relates to a vehicle surrounding situation estimation device.

2. Description of the Related Art

A technology is reported for reducing the damage of a secondary accident (secondary collision) that may subsequently be generated after detecting a primary accident (primary collision) generated by a collision between a vehicle and an obstacle outside the vehicle. For example, Published Japanese Translation of PCT application No. 2007-516127 discloses a technology for detecting and analyzing the surrounding environment of a vehicle after a collision using sensors and for performing the travel control, such as the brake operation or the steering operation, according to the result of comparison between the surrounding environment and the vehicle behavior.

The problem with the related art (Published Japanese Translation of PCT application No. 2007-516127) is that, if an abnormality such as damage to a sensor is generated by a primary accident, the surrounding environment of the vehicle cannot be detected. As a result, in the related art, it is sometimes difficult to perform the travel control of the vehicle by estimating the vehicle surrounding situation based on the detection result of the surrounding environment.

SUMMARY OF THE INVENTION

The present invention provides a vehicle surrounding situation estimation device that can suitably estimate the vehicle surrounding situation even when the surrounding situation cannot be detected because of an abnormality generated in a sensor due to a collision.

A vehicle surrounding situation estimation device in one aspect of the present invention includes: a collision detection unit that detects that a vehicle collides with an object outside the vehicle; a surrounding situation detection unit that detects a situation of a detection area around the vehicle; a surrounding situation estimation unit that estimates a situation of a prediction area around the vehicle at a collision time based on a detection result of the surrounding situation detection unit before the collision detection unit detects the collision; a surrounding situation recording unit that records the situation of the prediction area estimated by the surrounding situation estimation unit; and a surrounding situation prediction unit that predicts a situation of a vehicle surrounding area around the vehicle based on the situation of the prediction area after the collision detection unit detects the collision, the situation of the prediction area being recorded by the surrounding situation recording unit before the collision detection unit detects the collision.

In the aspect described above, the vehicle surrounding situation estimation device may further include a collision avoidance determination unit that determines whether collision between the vehicle and the object outside the vehicle can be avoided, the object outside the vehicle being detected by the surrounding situation detection unit, wherein the surrounding situation estimation unit may estimate the situation of the prediction area after the collision avoidance determination unit determines that the collision cannot be avoided and the surrounding situation recording unit may record the situation of the prediction area estimated by the surrounding situation estimation unit from a time the collision avoidance determination unit determines that the collision cannot be avoided to a time the collision detection unit detects the collision.

In the aspect described above, the vehicle surrounding situation estimation device may further include a sensor abnormality determination unit that determines whether there is an abnormality in a plurality of the surrounding situation detection units on the vehicle after the collision detection unit detects the collision wherein the surrounding situation prediction unit may predict the situation around the vehicle in such a way that, for a situation of an abnormally recognized area in the vehicle surrounding area corresponding to a detection area, which is set before the collision, of the surrounding situation detection unit determined by the sensor abnormality determination unit as abnormal after the collision detection unit detects the collision, the surrounding situation prediction unit predicts the situation based on the situation of the prediction area recorded by the surrounding situation recording unit before the collision detection unit detects the collision and, for a situation of a normally recognized area in the vehicle surrounding area corresponding to a detection area of the surrounding situation detection unit determined by the sensor abnormality determination unit as normal, the surrounding situation prediction unit predicts the situation based on the detection result of the surrounding situation detection unit.

In the aspect described above, the vehicle surrounding situation estimation device may further include a traveling control unit that performs traveling control for controlling a behavior of the vehicle based on the situation of the vehicle surrounding area predicted by the surrounding situation prediction unit after the collision detection unit detects the collision.

According to the aspect described above, the vehicle surrounding situation can be suitably estimated even when the surrounding situation cannot be detected because of an abnormality generated in a sensor due to a collision.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF THE EMBODIMENTS

An embodiment of a vehicle surrounding situation estimation device of the present invention is described in detail below with reference to the drawings. It should be noted that the present invention is not limited by this embodiment. Elements described in the embodiment include their variations readily thought of by those skilled in the art and substantially equivalent elements.

Figure 1:
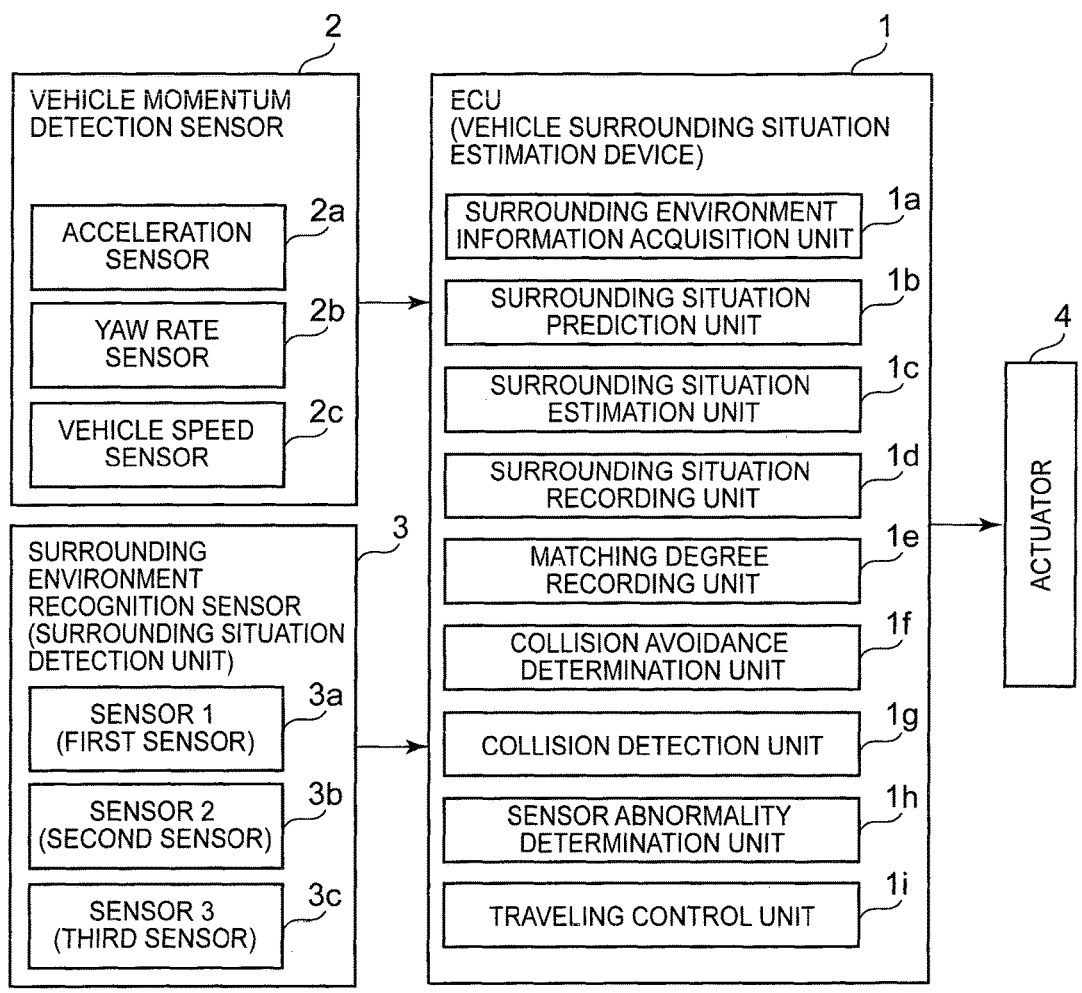
FIG. 1 is a diagram showing a configuration of a vehicle surrounding situation estimation device of the present invention.
Figure 2:
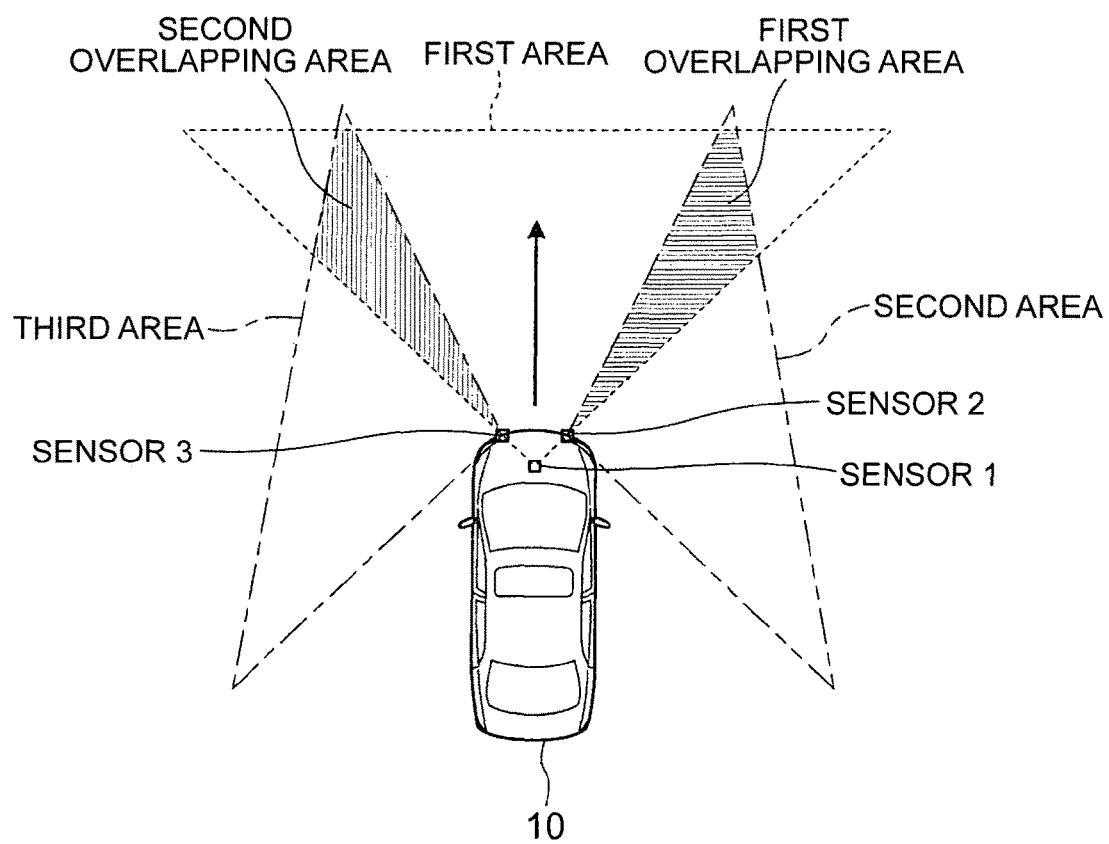
FIG. 2 is a diagram showing an example of the detection areas of a plurality of surrounding environment recognition sensors mounted on a vehicle.
Figure 3:
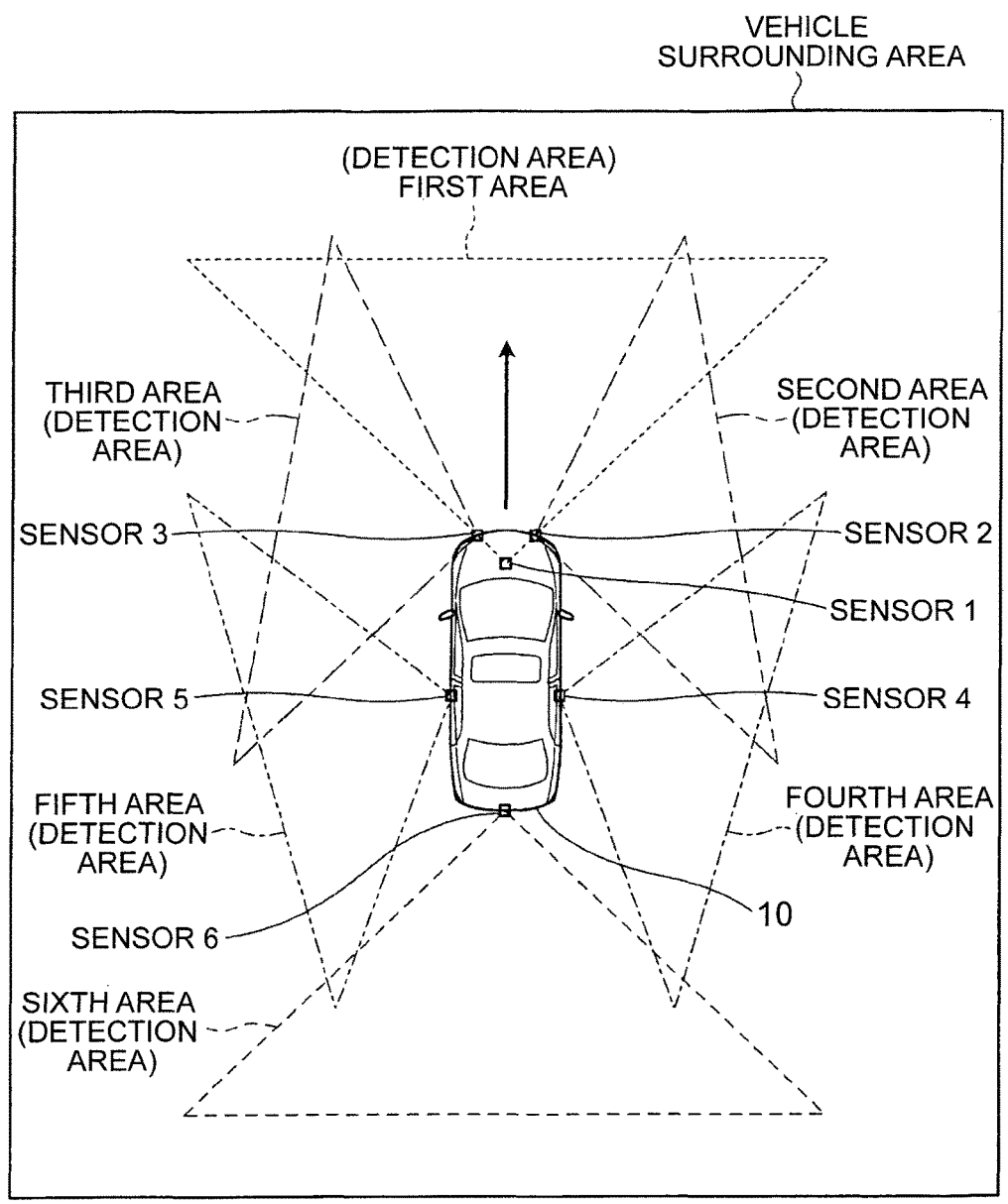
FIG. 3 is a diagram showing an example in which the situation of the vehicle surrounding area around the vehicle is predicted based on the detection result of the surrounding environment recognition sensors.
Figure 4:
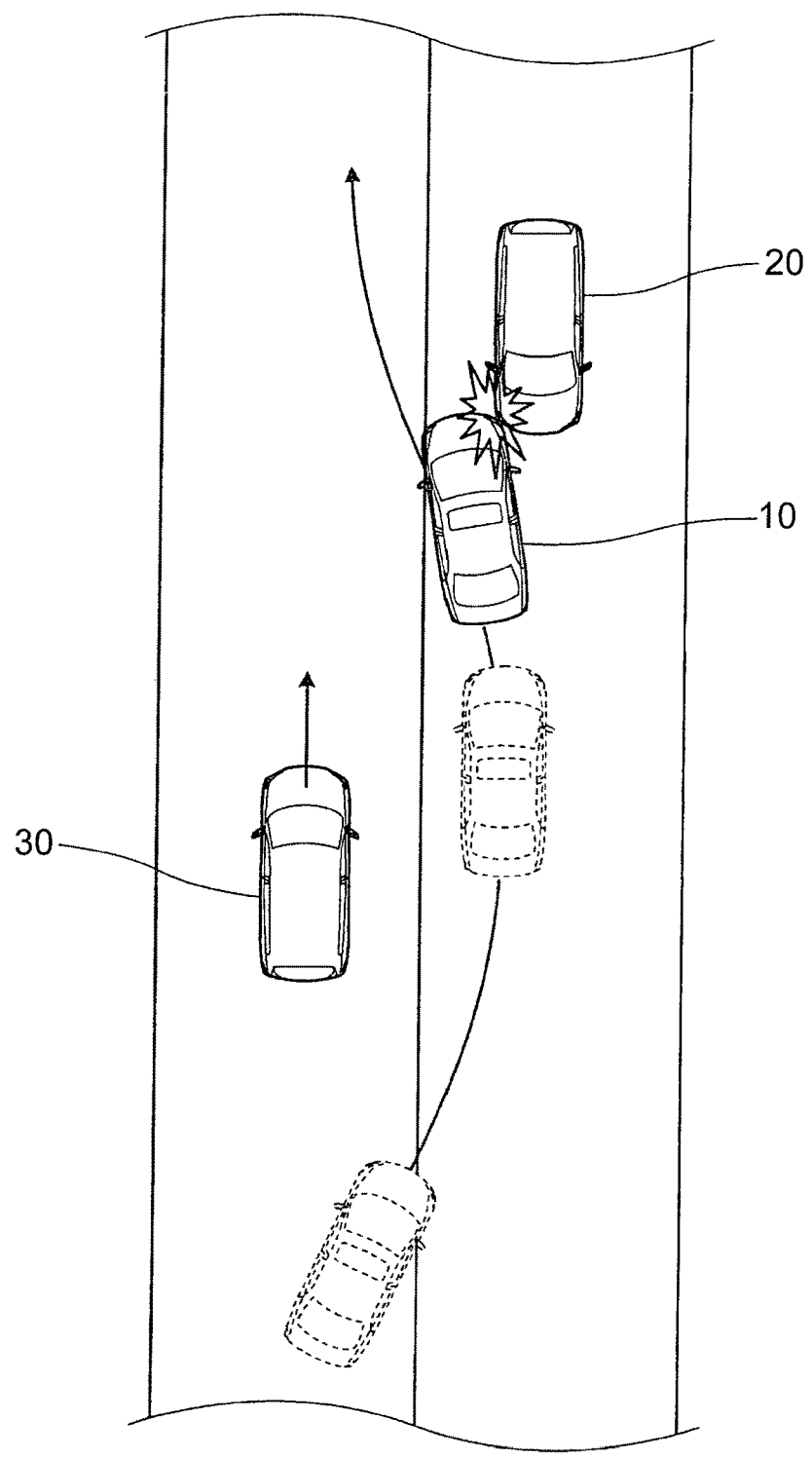
FIG. 4 is a diagram showing an example of a primary collision scene.
Figure 5:
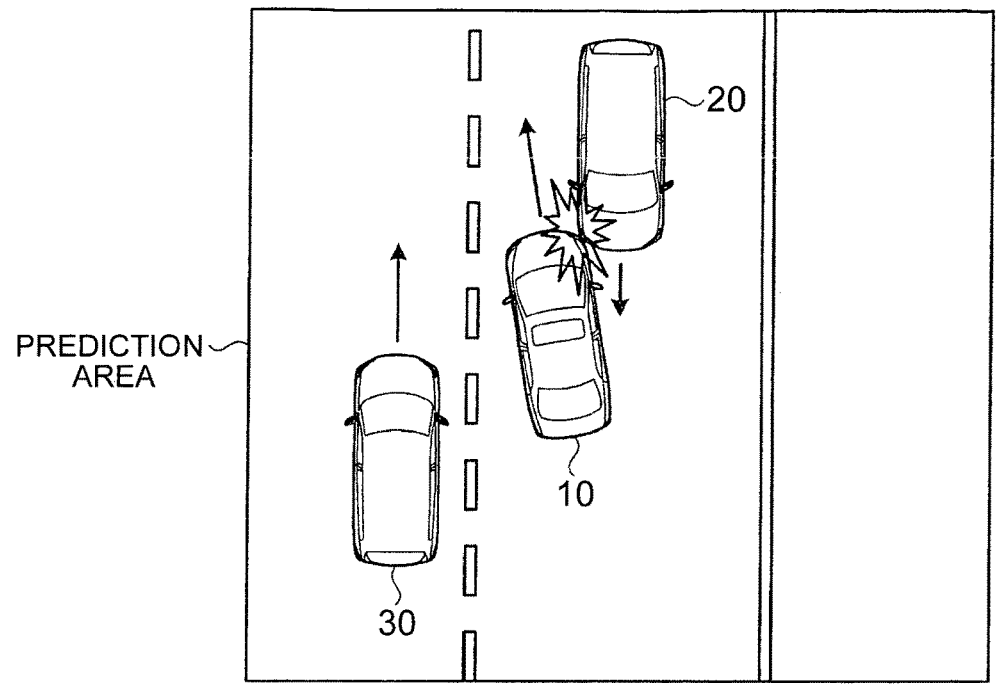
FIG. 5 is a diagram showing an example in which the situation of a prediction area, where the generation of a secondary collision around a vehicle at collision time is predicted, is estimated based on the surrounding environment information acquired before the collision is detected.
Figure 5:
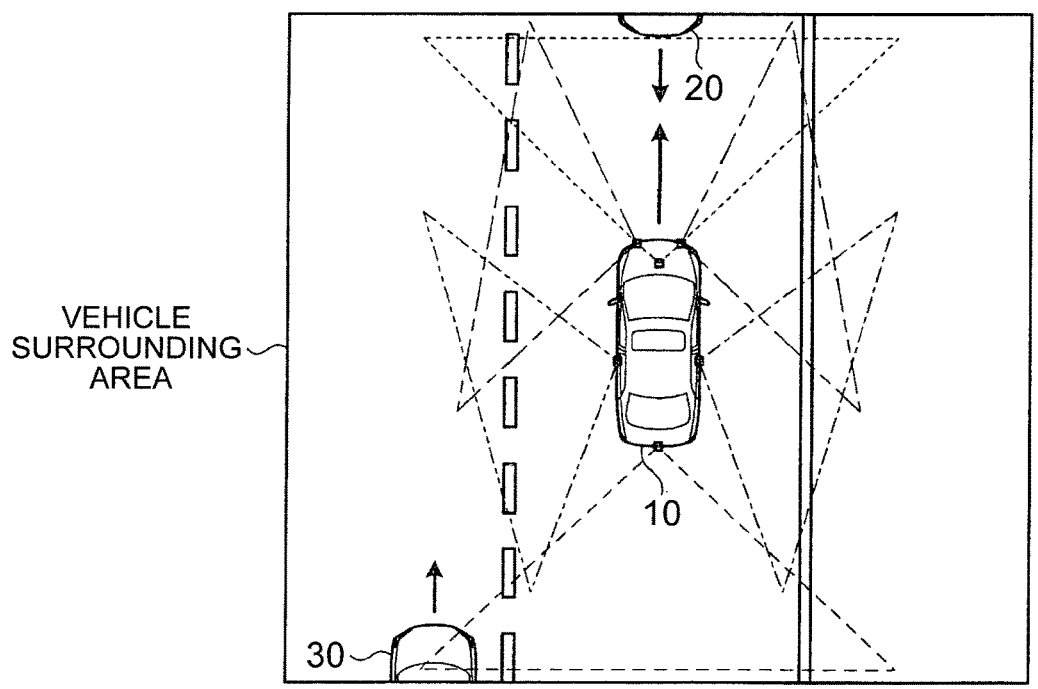
Figure 6:
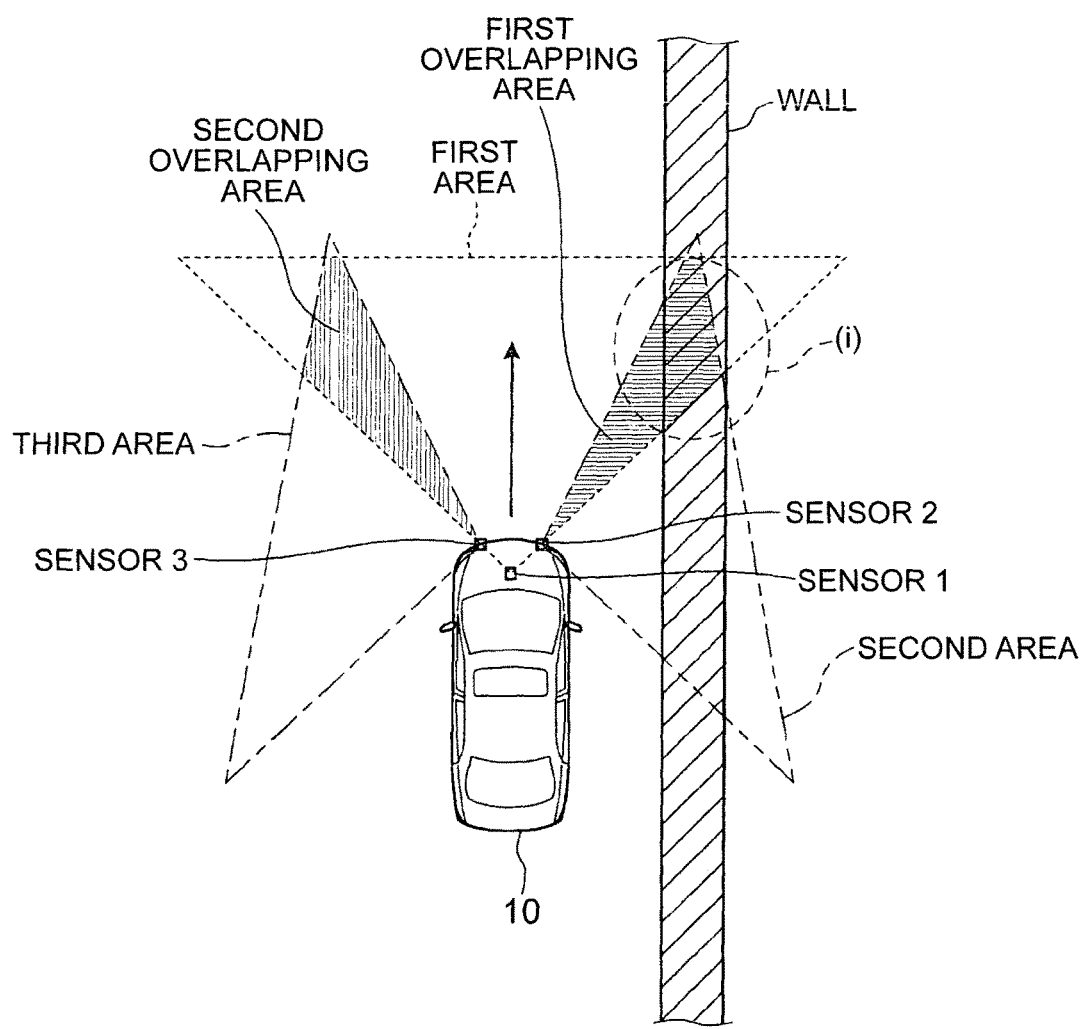
FIG. 6 is a diagram showing an example of the situation in which the matching degree of surrounding environment information is confirmed in an overlapping area between sensors.
Figure 7:
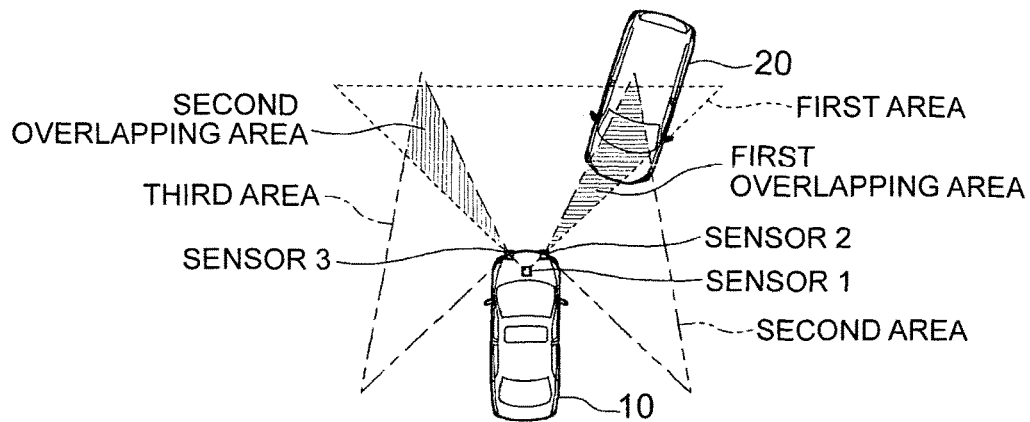
FIG. 7 is a diagram showing an example of the situation in which the matching degree of surrounding environment information is confirmed in an overlapping area between sensors immediately before a collision.
Figure 8:
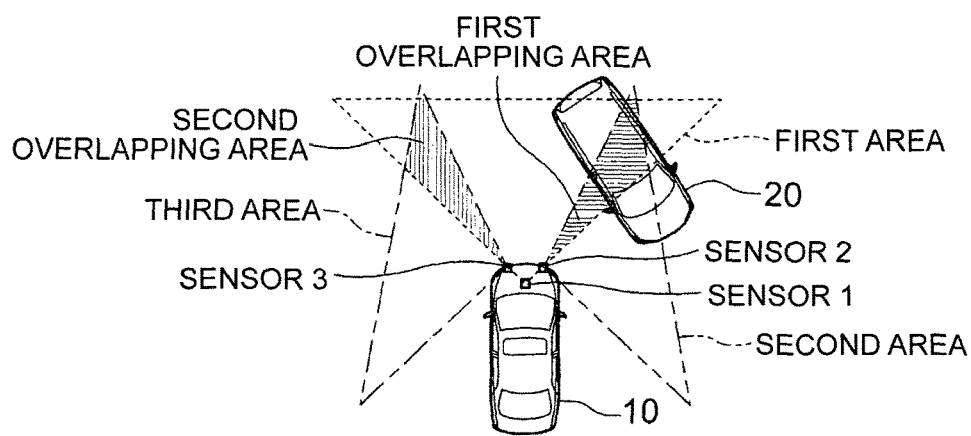
FIG. 8 is a diagram showing an example of the situation in which the sensor abnormality determination, performed immediately after a collision, is determined as normal.
Figure 9:
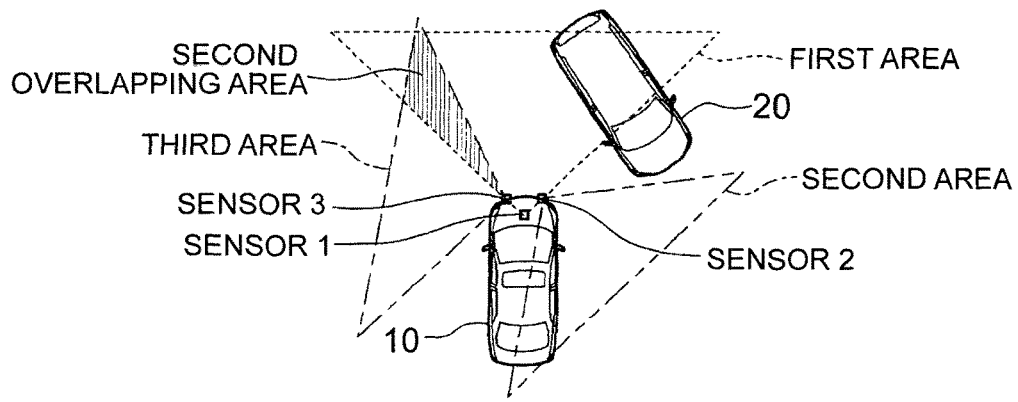
FIG. 9 is a diagram showing an example of the situation in which the sensor abnormality, determination, performed immediately after a collision, is determined as abnormal.
Figure 10:
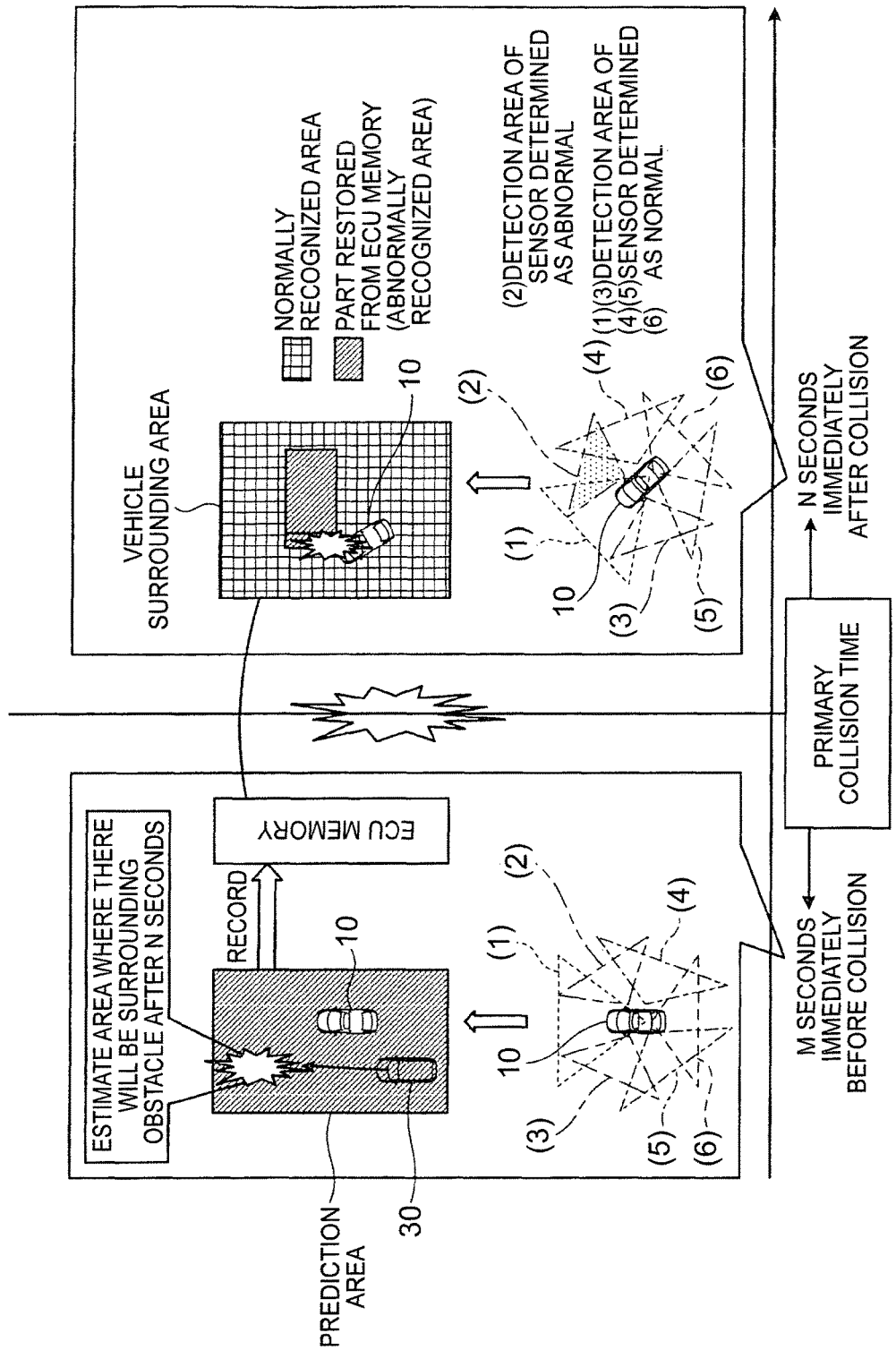
FIG. 10 is a diagram showing the outline of the prediction processing for a secondary collision generation area in this embodiment.

[Embodiment] With reference to FIG. 1 to FIG. 10, the configuration the vehicle surrounding situation estimation device of the present invention is described. FIG. 1 is a diagram showing a configuration of a vehicle surrounding situation estimation device of the present invention. FIG. 2 is a diagram showing an example of the detection area of a plurality of surrounding environment recognition sensors mounted in a vehicle. FIG. 3 is a diagram showing an example in which the situation of the vehicle surrounding area of the vehicle's surroundings is predicted based on the detection result of the surrounding environment recognition sensors. FIG. 4 is a diagram showing an example of a primary collision scene. FIG. 5 is a diagram showing an example in which the situation of a prediction area, where the generation of a secondary collision around a vehicle at collision time is predicted, is estimated based on the surrounding environment information acquired before the collision is detected. FIG. 6 is a diagram showing an example of the situation in which the matching degree of surrounding environment information is confirmed in an overlapping area between sensors. FIG. 7 is a diagram showing an example of the situation in which the matching degree of surrounding environment information is confirmed in an overlapping area between sensors immediately before a collision. FIG. 8 is a diagram showing an example of the situation in which the sensor abnormality determination immediately after a collision is determined normal. FIG. 9 is a diagram showing an example of the situation in which the sensor abnormality determination immediately after a collision is determined abnormal. FIG. 10 is a diagram showing the outline of prediction processing for a secondary collision generation area in an embodiment.

In this embodiment, an ECU 1 has the function of a vehicle surrounding situation estimation device, which estimates the vehicle surrounding situation, based on the detection result of a surrounding environment recognition sensor 3 mounted on a vehicle. In addition, the ECU 1 has the function of a sensor abnormality detection device that detects an abnormality in the surrounding environment recognition sensor 3 and the function of a vehicle control device that performs the driving support control for controlling the behavior of a vehicle. The ECU 1 is electrically connected to a vehicle momentum detection sensor 2, surrounding environment recognition sensor 3, and actuator 4. The ECU 1 performs arithmetic processing based on various signals received from the vehicle momentum detection sensor 2 and the surrounding environment recognition sensor 3. For example, based on various signals, the ECU 1 determines whether the vehicle has collided and, with consideration for an abnormality of the surrounding environment recognition sensor 3 that may be generated by the collision, estimates the vehicle surrounding situation immediately after the collision by using the vehicle surrounding situation estimated immediately before the collision. In addition, based on various signals, the ECU 1 determines whether the vehicle has collided and determines whether an abnormality, which may be generated by the collision, is generated in the surrounding environment recognition sensor 3. In addition to the processing described above, the ECU 1 performs the driving support control in which the ECU 1 outputs the control signal, generated based on these arithmetic processing results, to the actuator 4 to cause it to perform the driving support control for controlling the behavior of the vehicle.

The vehicle momentum detection sensor 2 is a vehicle momentum detection device that detects various types of information indicating the vehicle momentum. In this embodiment, the vehicle momentum detection sensor 2 includes an acceleration sensor 2a, a yaw rate sensor 2b, and a vehicle speed sensor 2c.

The acceleration sensor 2a is an acceleration detection device that detects the acceleration applied to the vehicle body. The acceleration sensor 2a outputs the acceleration signal, which indicates the detected acceleration, to the ECU 1.

The yaw rate sensor 2b is a yaw rate detection device that detects the yaw rate of the vehicle. The yaw rate sensor 2b outputs the yaw rate signal, which indicates the detected yaw rate, to the ECU 1.

The vehicle speed, sensor 2c, provided on each wheel, is a wheel speed detection device that detects the speed of each wheel. Each vehicle speed sensor 2c detects the wheel speed that is the rotation speed of each wheel. Each vehicle speed sensor 2c outputs the wheel speed signal, which indicates the detected wheel speed of each wheel, to the ECU 1. The ECU 1 calculates the vehicle speed, which is the traveling speed of the vehicle, based on the wheel speeds of the wheels received from the vehicle speed sensor 2c. The ECU 1 may calculate the vehicle speed based on the wheel speed received from at least one of the vehicle speed sensors 2c.

As described above, the vehicle momentum detection sensor 2 detects the acceleration detected by the acceleration sensor 2a, the yaw rate detected by the yaw rate sensor 2b, and the wheel speed detected by the vehicle speed sensor 2c, as various types of information indicating the vehicle momentum and outputs this information to the ECU 1.

The surrounding environment recognition sensor 3 is a surrounding environment recognition device that recognizes the vehicle surrounding situation such as a moving object or a stationary obstacle around the vehicle. That is, the surrounding environment recognition sensor 3 functions as a surrounding situation detection unit that detects the situation of a detected area around the vehicle. The surrounding environment recognition sensor 3 is configured by a radar or a camera. For example, the surrounding environment recognition sensor 3 acquires the following information as the surrounding environment information: the relative position of a guardrail and a white line on the road, the relative position of a surrounding stationary target, and the relative position, relative speed, and relative acceleration of a surrounding moving target (for example, a moving target in front, in back, and on side of vehicle). The surrounding environment recognition sensor 3 outputs the acquired surrounding environment information to the ECU 1. Furthermore, in addition to the information on the relative, position and the relative speed of a recognized object around the vehicle, the surrounding environment recognition sensor 3 may acquire the information on the attribute of a surrounding obstacle, such as the strength, brightness, and color of a recognized object, as the surrounding environment information and may output the acquired information to the ECU 1. For example, when the surrounding environment recognition sensor 3 is configured by a radar, the wavelength pattern of the reflected wave of the radar depends on whether the strength of an object, recognized by the surrounding environment recognition sensor 3 as a recognition target, is hard or soft. The surrounding environment recognition sensor 3 uses this difference in the wavelength pattern to detect the strength of a recognition target. The brightness and the color of a recognition target is detected by the difference in the wavelength pattern of the reflected wave of the radar when the surrounding environment recognition sensor 3 is configured by a radar, and by the difference in the contrast of an image when the surrounding environment recognition sensor 3 is configured by a camera.

In this embodiment, a plurality of surrounding environment recognition sensors 3 is mounted on a vehicle. For example, as shown in FIG. 1, the surrounding environment recognition sensor 3 is configured by sensor 1 that is the first sensor, sensor 2 that is the second sensor, and sensor 3 that is the third sensor. The number of surrounding environment recognition sensors mounted on a vehicle is not limited to three as shown in the example in FIG. 1 but three of more sensors may be mounted.

Sensors 1 to 3 detect the situation of different detection areas. For example, sensor 1 functions as a first sensor that detects the situation of a first area around the vehicle. Sensor 2 functions as a second sensor that detects the situation of a second area around the vehicle that is different from the first area and is partially overlapped with the first area. Sensor 3 functions as a third sensor that detects the situation of a third area around the vehicle that is different from the first area and the second area and is partially overlapped with the first area.

One example is described below in which sensors 1 to 3 are installed on the front of a vehicle 10 as shown in FIG. 2. In FIG. 2, sensor 1 detects the situation of the detection area (first area in FIG. 2) that covers the traveling direction side of the vehicle 10. Sensor 2 detects the situation of the detection area (second area in FIG. 2) that covers the area ranging from the front right to the right side of the vehicle. Sensor 3 detects the situation of the detection area (third area in FIG. 2) that covers the area ranging from the front left to the left side of the vehicle. The first area detected by sensor 1 and, the second area detected by sensor 2 are partially overlapped. The boundary area between the detection area of sensor 1 and the detection area of sensor 2 is called a first overlapping area. Similarly, the first area detected by sensor 1 and the third area detected by sensor 3 are partially overlapped. The boundary area between the detection area of sensor 1 and the detection area of sensor 3 is called a second overlapping area. The installation position of the sensors is not limited to the front as shown in FIG. 2; instead of the front, they may be installed on the right side, left side, or rear side.

Returning to FIG. 1, the description of the configuration of the vehicle surrounding situation estimation device of the present invention is continued. The ECU 1 includes at least a surrounding environment information acquisition unit 1a, a surrounding situation prediction unit 1b, a surrounding situation estimation unit 1c, a surrounding situation recording unit 1d, a matching degree recording unit 1e, a collision avoidance determination unit 1f, a collision detection unit 1g, a sensor abnormality determination unit 1h, and a traveling control unit 1i.

The surrounding environment information acquisition unit 1a of the ECU 1 is a surrounding environment information acquisition unit that receives and acquires surrounding environment information. This surrounding environment information, sent from the surrounding environment recognition sensor 3, indicates the vehicle surrounding situation such as a moving object or a stationary obstacle around the vehicle. That is, the surrounding environment information acquisition unit 1a acquires the detection result of the surrounding environment recognition sensor 3, which works as a surrounding situation detection unit, as the surrounding environment information. For example, in this embodiment, the surrounding environment information acquisition unit 1a receives and acquires the surrounding environment information. This surrounding environment information, sent respectively from a sensor 3a, a sensor 3b, and a sensor 3c mounted as the surrounding environment recognition sensor 3, indicates the situation of the first area, second area, and third area.

The surrounding situation prediction unit 1b is a surrounding situation prediction unit that predicts the vehicle surrounding situation based on the surrounding environment information acquired from the surrounding environment information acquisition unit 1a, that is, based on the detection result of the surrounding environment recognition sensor 3 that works as the surrounding situation detection unit. For example, the surrounding situation prediction unit 1b predicts the situation of the vehicle surrounding area around the vehicle. The vehicle surrounding area is an area around the current position of the vehicle different from the detection areas detected by the surrounding environment recognition sensor 3. This vehicle surrounding area is set as a range that includes a plurality of detection areas detected by the surrounding environment recognition sensor 3. For example, using the surrounding environment information that indicates the relative position, relative speed, and attribute of an object outside the vehicle detected in the detection areas detected by the plurality of surrounding environment recognition sensors 3 mounted on the vehicle, the surrounding situation prediction unit 1b predicts the situation of an obstacle that may collide with the vehicle in the vehicle surrounding area.

FIG. 3 shows an example in which sensors 1 to 3 are installed on the front of the vehicle 10, sensor 4 on the right side of the vehicle 10, sensor 5 on the left side of the vehicle 10, and sensor 6 on the rear of the vehicle 10. In FIG. 3, sensors 1 to 6 detect the situation of different detection areas. Sensor 1 detects the situation of the first area in the traveling direction side, sensor 2 detects the situation of the second area ranging from the front right to the right side, sensor 3 detects the situation of the third area ranging from the front left to the left side, sensor 4 detects the situation of the fourth area ranging from the rear right to the right side, sensor 5 detects the situation of the fifth area ranging from the rear left to the left side, and sensor 6 detects the situation of the sixth area in the direction side opposite to the traveling direction, respectively. The surrounding situation prediction unit 1b predicts the situation of the vehicle surrounding area, which is set in a predetermined range around the vehicle position where the vehicle 10 is currently positioned, using the surrounding environment information indicating the situation in the first area to the sixth area of sensors 1 to 6 acquired by the surrounding environment information acquisition unit 1a.

In this embodiment, the surrounding situation prediction unit 1b predicts the situation of the vehicle surrounding area by identifying the current position of an object outside the vehicle, based on the surrounding environment information sent from the surrounding environment information acquisition unit 1a. For example, the surrounding situation prediction unit 1b identifies the current position of an obstacle around the vehicle, based on the detection result of a plurality of surrounding environment recognition sensors 3. More specifically, the surrounding situation prediction unit 1b identifies the current position of an obstacle based on the relative position, relative speed, and relative acceleration between an obstacle, included in the surrounding environment information, and the vehicle.

Here, in addition to the surrounding environment information acquired by the surrounding environment information acquisition unit 1a, the surrounding situation prediction unit 1b may also use various types of vehicle momentum information, sent from the vehicle momentum detection sensor 2, to identify the vehicle's position and the tilting state and then predict the vehicle surrounding situation.

Returning to FIG. 1, the description of the configuration of the vehicle surrounding situation estimation device of the present invention is continued. The surrounding situation estimation unit 1c of the ECU 1 is a surrounding situation estimation unit that estimates the situation of the prediction area around the vehicle at collision time, based on the surrounding environment information acquired by the surrounding environment information acquisition unit 1a, before the collision detection unit 1g detects a collision.

For example, as shown in FIG. 4, a scene, in which the vehicle 10, a host vehicle, passes another preceding vehicle 30 traveling in the same lane and collides with another vehicle 20 traveling in the oncoming lane, indicates a situation in which a secondary collision between the vehicle 10 and a vehicle 30 will be generated later. In such a situation, after the collision avoidance determination unit 1f determines that the collision with the vehicle 20 cannot be avoided as shown in the figure at the bottom of FIG. 5, the surrounding situation estimation unit 1c estimates the situation of the prediction area around the vehicle at the time of collision with the vehicle 20 as shown in the figure at the top of FIG. 5, based on the detection result of the surrounding environment recognition sensor 3 before the collision detection unit 1g detects the collision with the vehicle 20 (surrounding environment information on the relative position and relative speed of the vehicle 20 and the vehicle 30 in FIG. 5). In this embodiment, the prediction area refers to an area that is set in a predetermined range around the prediction position where the primary collision of the vehicle 10 with an object outside the vehicle (vehicle 20 in FIG. 5) will be generated after the elapse of a predetermined time. The range of the prediction area may be the same range as that of the vehicle surrounding area or a different range.

In this embodiment, the surrounding situation estimation unit 1c estimates the situation of the prediction area by predicting the position of an object outside the vehicle after the elapse of a predetermined time, based on the surrounding environment information sent from the surrounding environment information acquisition unit 1a. The predetermined time is set based on the time to collision calculated by the collision avoidance determination unit 1f. For example, the surrounding situation estimation unit 1c predicts the position of an obstacle around the vehicle after the elapse of a predetermined time, based on the detection result of the plurality of surrounding environment recognition sensors 3. The surrounding situation estimation unit 1c predicts the position, to which an obstacle will be moved after the elapse of a predetermined time, as the position of the obstacle, based on the relative position, relative speed, and relative acceleration between the obstacle included in the surrounding environment information and the vehicle. The predetermined time is set, for example, to the time that will elapse until the vehicle 10 collides with the obstacle.

Here, in addition to the surrounding environment information acquired by the surrounding environment information acquisition unit 1a, the surrounding situation estimation unit 1c may also use various types of vehicle momentum information, sent from the vehicle momentum detection sensor 2, to predict the vehicle's position and tilting state at the collision time and then estimate the situation of the prediction area where the generation of a secondary collision around the vehicle is predicted at the collision time.

Returning to FIG. 1, the description of the configuration of the vehicle surrounding situation estimation device of the present invention is continued. The surrounding situation recording unit 1d of the ECU 1 is a surrounding situation recording unit that records the situation of a prediction area around the vehicle at collision time that is estimated by the surrounding situation estimation unit 1c. In this embodiment, the surrounding situation recording unit 1d records the situation of a prediction area that is estimated by the surrounding situation estimation unit 1c from the time the collision avoidance determination unit 1f determines that the collision cannot be avoided to the time before the collision detection unit 1g detects the collision. For example, the surrounding situation recording unit 1d sends the situation of a prediction area, estimated by the surrounding situation estimation unit 1c, to the memory of the ECU 1 for recording it therein in association with the estimation time.

The matching degree recording unit 1e is a matching degree recording unit that calculates and records the matching degree of the surrounding environment information in an overlapping area, detected by the surrounding environment recognition, sensor 3, based on the surrounding environment information acquired by the surrounding environment information acquisition unit 1a.

For example, as shown in FIG. 6, the matching degree recording unit 1e calculates and records the matching degree of the surrounding environment information in a boundary area between the sensors. In FIG. 6, in the overlapping area between sensor 1 and sensor 2 (first overlapping area in FIG. 6), the matching degree recording unit 1e calculates and records the matching degree of the surrounding environment information about the wall on the right side of the vehicle 10 (position indicated by (i) in FIG. 6) that is a recognition target.

In such a case, the matching degree recording unit 1e receives the information, including the relative position of the wall that is a recognition target detected in the first overlapping area in the first area, the strength indicating the hardness or softness of the wall itself, the brightness of the wall, and the color of the wall, from the surrounding environment information acquisition unit 1a as the surrounding environment information detected by sensor 1. Similarly, the matching degree recording unit 1e receives the information, including the relative position of the wall that is a recognition target detected in the first overlapping area in the second area and the strength, brightness, and color of the wall, from the surrounding environment information acquisition unit 1a as the surrounding environment information detected by sensor 2. After that, for each parameter (relative position of the wall, intensity, brightness, and color in FIG. 6), the matching degree recording unit 1e compares the surrounding environment information detected by sensor 1 with the surrounding environment information detected by sensor 2. Next, if the compared parameter is equal between sensor 1 and sensor 2 or if the compared parameter is different between sensor 1 and sensor 2 but the difference is within a predetermined threshold, the matching degree recording unit 1e determines that the matching degree is high. For example, when comparing the relative position of the wall detected by sensor 1 and the relative position of the wall detected by, sensor 2, the matching degree recording unit 1e sets either the installation position of one of sensor 1 and sensor 2 or a predetermined position on the vehicle as the reference position. After that, the matching degree recording unit 1e calculates the relative position between, the reference position and the wall and compares between the calculated relative positions to determine the matching degree. For the information about the attribute of the wall (for example, strength, brightness, and color of the wall), the matching degree recording unit 1e compares the situation detected by sensor 1 and the situation detected by sensor 2 to determine the matching degree.

On the other hand, if the compared parameter (for example, the relative position of the wall detected by sensor 1 and the relative position of the wall detected by sensor 2) is different between sensor 1 and sensor 2 and the difference is out of a predetermined threshold, the matching degree recording unit 1e determines that the matching degree is low. In addition, if there is no overlapping area between sensor 1 and sensor 2, the matching degree recording unit 1e determines that the matching degree of the surrounding environment information is low. For each of the compared parameters (for example, strength, brightness, and color of the wall), the matching degree recording unit 1e performs processing for determining if the matching degree of the surrounding environment information between sensor 1 and sensor 2 is high or low, and calculates the matching degree of the surrounding environment information based on the matching degree level determined for each parameter. The matching degree of the surrounding environment information may be obtained, for example, by scoring the level of the matching degree determined for each parameter and by calculating the sum of the scores.

In the example in FIG. 6, for the sake of description, the calculation of the matching degree of the surrounding environment information is described only for the wall detected in the first overlapping area that is a boundary area between sensor 1 and sensor 2. In this embodiment, the matching degree recording unit 1e calculates the matching degree of the surrounding environment information for each pair of sensors that have an overlapping area. For example, in addition to the calculation of the matching degree of the surrounding environment information about the wall detected in the first overlapping area, the matching degree recording unit 1e calculates the surrounding environment information about a recognition target detected in the second overlapping area in the first area of sensor 1 and the surrounding environment information about a recognition target detected in the second, overlapping area in the third area of sensor 3 for each parameter and, then, calculates the matching degree of the surrounding environment information. After that, the matching degree recording unit 1e sends the calculated matching degree to, and records it in, the memory of the ECU 1 in association with the calculation time.

In this embodiment, the matching degree recording unit 1e calculates and records the matching degree of the surrounding environment information at a predetermined time. For example, the matching degree recording unit 1e calculates and records the matching degree of the surrounding environment information in an overlapping area of the surrounding environment recognition sensor 3 at the time immediately before a collision (that is, at the time the collision avoidance determination unit 1f determines that collision cannot be avoided) or at the time immediately after a collision (that is, at the time the collision detection unit 1g detects a collision).

Returning to FIG. 1, the description of the configuration of the vehicle surrounding situation estimation device of the present invention is continued. The collision avoidance determination unit 1f of the ECU 1 is a collision avoidance determination unit that determines whether collision between the vehicle 10 and an object outside the vehicle can be avoided, based on various types of information indicating the vehicle momentum sent from the vehicle momentum detection sensor 2 and on the surrounding environment information sent from the surrounding environment information acquisition unit 1a. For example, the collision avoidance determination unit 1f calculates the time to collision (the so-called the collision prediction time (Time-To-Collision: TTC)) between an object outside the vehicle and the vehicle 10, based on the relative position and the relative speed between an object outside the vehicle and the vehicle 10 indicated by the surrounding environment information and on the vehicle speed and the acceleration of the vehicle 10 included in the information indicated by the vehicle momentum. The collision avoidance determination unit 1f determines that collision can be avoided if the calculated TTC is equal to or higher than a predetermined threshold, and that collision cannot be avoided if the calculated TTC is smaller than the predetermined threshold.

The collision detection unit 1g is a collision detection unit that detects that the vehicle collides with an object outside the vehicle, based on various types of information indicating the vehicle momentum sent from the vehicle momentum detection sensor 2 and on the surrounding environment information sent from the surrounding environment information acquisition unit 1a. For example, the collision detection unit 1g detects collision between a collision target and the vehicle 10 based on the relative position between the collision target and the vehicle 10 indicated by the surrounding environment information and on a change in the acceleration and yaw rate of the vehicle 10 included in the information indicated by the vehicle momentum.

The sensor abnormality determination unit 1h is a sensor abnormality determination unit that determines whether there is an abnormality in the plurality of surrounding environment recognition sensors 3, mounted on the vehicle, after the collision detection unit 1g detects a collision. In this embodiment, the sensor abnormality determination unit 1h determines whether there is an abnormality in the first sensor that detects the situation of the first area around the vehicle and in the second sensor that detects the situation of the second area around the vehicle that is different from the first area and that partially overlaps with the first area. The sensor abnormality determination unit 1h determines that the first sensor and the second sensor are normal in the situation in which, after the collision detection unit 1g detects a collision, there is an overlapping area where the first area and the second area partially overlap; on the other hand, in the situation in which the first area and the second area do not overlap in the overlapping area, the sensor abnormality determination unit 1h determines that at least one of the first sensor and the second sensor is abnormal. More specifically, the sensor abnormality determination unit 1h determines that, after the collision-detection unit 1g detects a collision, at least one of the first sensor and the second sensor is abnormal if the first sensor and the second sensor do not detect the same situation in the overlapping area.

For example, with reference to FIG. 7 to FIG. 9, the following describes the processing performed by the sensor abnormality determination unit 1h for determining whether there is an abnormality in the sensors, where the first sensor is sensor 1, the second sensor is sensor 2, and an overlapping area where the first area and the second area partially overlap is a first overlapping area.

FIG. 7 shows the situation in which the vehicle 10, a host vehicle, cannot avoid collision with another vehicle 20 that is a moving object around the vehicle. In a situation such as the one shown in FIG. 7, the collision avoidance determination unit 1f of the ECU 1 first calculates the time to collision (TTC) between the vehicle 20 and the vehicle 10 based on the relative position and the relative speed between the vehicle 20 and the vehicle 10 indicated by the surrounding environment information and on the vehicle speed and the acceleration of the vehicle 10 included in the information indicated by the vehicle momentum. After that, because the calculated TTC is smaller than the predetermined threshold, the collision avoidance determination unit 1f determines that collision cannot be avoided. Next, if the collision avoidance determination unit 1f determines that collision cannot be avoided (that is, at the time immediately before the collision), the matching degree recording unit 1e of the ECU 1 calculates and records the matching degree of the surrounding environment information in the overlapping area of the surrounding environment recognition sensor 3. More specifically, in the example shown in FIG. 7, the matching degree recording unit 1e receives the information, which includes the relative position of the vehicle 20 detected in the first overlapping area in the first area and the intensity, brightness, and color of the vehicle 20, from the surrounding environment information acquisition unit 1a as the surrounding environment information detected by sensor 1. Similarly, the matching degree recording unit 1e receives the information, which includes the relative position of the vehicle 20 detected in the first overlapping area in the second area and the intensity, brightness, and color of the vehicle 20, from the surrounding environment information acquisition unit 1a as the surrounding environment information detected by sensor 2. After that, for each parameter (in FIG. 7, the relative position, strength, brightness, and color of the vehicle 20), the matching degree recording unit 1e compares the surrounding environment information detected by sensor 1 and the surrounding environment information detected by sensor 2 for calculating the matching degree, and sends the calculated matching degree to, and records it in, the memory of the ECU 1 in association with the calculation time. In the example in FIG. 7, because the relative position of the vehicle 20 and the strength, brightness, and color of the vehicle 20, detected by sensor 1 in the first overlapping area, are approximately equal to the relative position of the vehicle 20 and the strength, brightness, and color of the vehicle 20, detected by sensor 2 in the first overlapping area, the matching degree recording unit 1e, records that the matching degree of the surrounding environment information about the vehicle 20, detected in the first overlapping area that is a boundary area between sensor 1 and sensor 2, is high.

FIG. 8 shows the situation in which, immediately after the vehicle 10 that is a host vehicle collides with another vehicle 20 that is a moving object around the vehicle, the sensors are working properly even after the collision. In a situation such as the one shown in FIG. 8, the collision detection unit 1g of the ECU 1 first detects collision between the vehicle 20 and the vehicle 10, based on the relative position between the vehicle 20 and the vehicle 10 indicated by the surrounding environment information and on a change in the acceleration and, yaw rate of the vehicle 10 included in the information indicated by the vehicle momentum. After that, when the collision detection unit 1g detects the collision (that is, at the time immediately after the collision), the matching degree recording unit 1e of the ECU 1 calculates and records the matching degree of the surrounding environment information in the overlapping area of the surrounding environment recognition sensor 3. More specifically, in the example in FIG. 8, the matching degree recording unit 1e calculates and records the matching degree between the surrounding environment information about the vehicle 20 acquired in the first overlapping area in the first area of sensor 1 and the surrounding environment information about the vehicle 20 acquired in the first overlapping area in the second area of sensor 2. In the example in FIG. 8, because the relative position of the vehicle 20 and the strength, brightness, and color of the vehicle 20, detected by sensor 1 in the first overlapping area, are approximately equal to the relative position of the vehicle 20 and the strength, brightness, and color of the vehicle 20, detected by sensor 2 in the first overlapping area, the matching degree recording unit 1e records that the matching degree of the surrounding environment information about the vehicle 20, detected in the first overlapping area that is a boundary area between sensor 1 and sensor 2, is high.

Next, the sensor abnormality determination unit 1h of the ECU 1 loads the matching degree of the surrounding environment information, recorded by the matching degree recording unit 1e at the time immediately before the collision as shown in the example in FIG. 7, from the memory of the ECU 1. After that, the sensor abnormality determination unit 1h compares the loaded matching degree of the surrounding environment information about the vehicle 20 at the time immediately before the collision with the matching degree of the surrounding environment information recorded by the matching degree recording unit 1e at the time immediately after the collision as shown in the example in FIG. 8. As a result of comparison, if the matching degree of the surrounding environment information at the time immediately before the collision is high as shown in the example in FIG. 7 and if the matching degree of the surrounding environment information at the time immediately after the collision is high as shown in the example in FIG. 8, the two matching degrees are approximately equal. In this case, the sensor abnormality determination unit 1h determines that no abnormality is generated in sensor 1 and sensor 2 before and after the collision. This determination is based on the consideration that an abnormality, such as an imperfect alignment, is generated by the collision neither in sensor 1 nor in sensor 2 and that a change is generated by the collision neither in the first area covered by sensor 1 nor in the second area covered by sensor 2. In this way, if there is an overlapping area where the first area and the second area partially overlap after the collision detection unit 1g detects a collision, the sensor abnormality determination unit 1h determines that the first sensor and the second sensor are normal. More specifically, if the first sensor and the second sensor detect the same situation in an overlapping area after the collision detection unit 1g detects a collision, the sensor abnormality determination unit 1h determines that the first sensor and the second sensor are normal.

FIG. 9 shows the situation in which, immediately after the vehicle 10 that is a host vehicle collides with another, vehicle 20 that is a moving object around the vehicle, an abnormality is generated in the sensors by the collision. In a situation such as the one shown in FIG. 9, the collision detection unit 1g of the ECU 1 first, detects collision between the vehicle 20 and the vehicle 10, based on the relative position between the vehicle 20 and the vehicle 10 indicated by the surrounding environment information and on a change in the acceleration and yaw rate of the vehicle 10 included in the information indicated by the vehicle momentum. After that, when the collision detection unit 1g detects the collision (that is, at the time immediately after the collision), the matching degree recording unit 1e of the ECU 1 calculates and records the matching degree of the surrounding, environment information in the overlapping area of the surrounding environment recognition sensor 3. However, in the example in FIG. 9, because an abnormality such as an imperfect alignment is generated in sensor 2, mounted on the vehicle 10, due to the collision with the vehicle 20 and therefore the second area is changed, there is no first overlapping area where the first area covered by sensor 1 and the second area covered by sensor 2 partially overlap. Therefore, when calculating the matching degree of the surrounding environment information in the overlapping area of the surrounding environment recognition sensor 3, the matching degree recording unit 1e records that the matching degree is low because there is no overlapping area.

Next, the sensor abnormality determination unit 1h of the ECU 1 loads the matching degree of the surrounding environment information, stored by the matching degree, recording unit 1e at the time immediately before the collision as shown in the example in FIG. 7, from the memory of the ECU 1. After that, the sensor abnormality determination unit 1h compares the loaded matching degree of the surrounding environment information about the vehicle 20 at the time immediately before the collision with the matching degree of the surrounding environment information recorded by the matching degree recording unit 1e at the time immediately after the collision as shown in the example in FIG. 9. As a result of comparison, if the matching degree of the surrounding environment information at the time immediately before the collision is high as shown in the example in FIG. 7 but if the matching degree of the surrounding environment information at the time immediately after the collision is low as shown in the example in FIG. 9, the two matching degrees are not equal. In this case, the sensor abnormality determination unit 1h determines that an abnormality is generated in at least one of sensor 1 and sensor 2 before and after the collision. This determination is based on the consideration that an abnormality, such as an imperfect alignment, is generated by the collision in at least one of sensor 1 and sensor 2 and that a change is generated by the collision in one of the first area covered by sensor 1 and the second area covered by sensor 2. In this way, if the first area and the second area do not overlap in the overlapping area after the collision detection unit 1g detects a collision, the sensor abnormality determination unit 1h determines that there is an abnormality in at least one of the first sensor and the second sensor. More specifically, if the first sensor and the second sensor do not detect the same situation in an overlapping area after the collision detection unit 1g detects a collision, the sensor abnormality determination unit 1h determines that there is an abnormality in at least one of the first sensor and the second sensor.

At this time, for the second, overlapping area where the first area, covered by sensor 1, and the third area, covered by sensor 3, partially overlap, the sensor abnormality determination unit 1h may compare the matching degrees of the surrounding environment information before and after the collision. This comparison allows the sensor abnormality determination unit 1h to determine in which sensor, sensor 1 or sensor 2, whether an abnormality is generated based on the comparison result of the matching degrees of the surrounding environment information in the second overlapping area. In the example in FIG. 9, if the first area and the second area do not overlap in the overlapping area, more specifically, if the first sensor and the second sensor do not detect the same situation in the overlapping area, the sensor abnormality determination unit 1h determines that there is an abnormality in at least one of the first sensor and the second sensor. At this point in time, it is unknown in which sensor, first sensor or second sensor, the abnormality is generated. In this case, if the matching degrees of the surrounding environment information in the second overlapping area before and after the collision are approximately equal as a result of comparison, the sensor abnormality determination unit 1h determines that the abnormality is generated not in the first sensor but in the second sensor. On the other hand, if the matching degrees of the surrounding environment information in the second overlapping area before and after the collision are not equal as a result of comparison, the sensor abnormality determination unit 1h determines that the abnormality is generated not in the second sensor but in the first sensor or that the abnormality is generated both in the first sensor and the second sensor.

Returning to FIG. 1, the description of the configuration of the vehicle surrounding situation estimation device of the present invention is continued. The traveling control unit 1i of the ECU 1 is a traveling control unit that performs traveling control for controlling the behavior of the vehicle 10, based on the various types of information indicating the vehicle momentum sent from the vehicle momentum detection sensor 2 and on the vehicle surrounding situation predicted by the surrounding situation prediction unit 1b.

The traveling control unit 1*i* calculates a running path and a running speed by which the vehicle 10 can avoid an obstacle, based on the vehicle speed and the acceleration of the vehicle 10 included in the information indicated by the vehicle momentum, various types of information indicating an area, where the vehicle 10 can travel, that is indicated by the predicted vehicle surrounding situation (for example, the situation of vehicle surrounding area), and the position of an obstacle that is an avoidance target. The traveling control unit 1*i* outputs the control signal, generated based on this calculation processing result, to the actuator 4 to cause it to perform the traveling control. The traveling control unit 1*i* controls the steering angle of the steering wheels of the vehicle 10 via the actuator 4 such as an EPS for performing the steering support so that the vehicle 10 avoids an obstacle. To avoid an obstacle more reliably, the traveling control unit 1*i* may perform the operation by combining the steering support with the brake support. In this way, the traveling control unit 1*i* functions as a traveling control unit that prevents the vehicle 10 from moving to the position of an obstacle.

If the collision avoidance determination unit 1*f* determines that collision with an obstacle can be avoided, the collision with the obstacle can be avoided by performing the traveling control described above through the processing of the traveling control unit 1*i*. However, if the collision avoidance determination unit 1*f* determines that collision with an obstacle cannot be avoided, the primary collision may not be avoided even through the processing of the traveling control unit 1*i*. Even in such a case, it is desirable that, from the viewpoint of safety, the vehicle 10 be controlled to be moved to a safe position immediately after the primary collision in order to minimize the impact of a secondary collision that may subsequently be caused. The traveling control unit 1*i* may perform the driving support control for avoiding a secondary collision by performing the traveling control even after a primary collision. In this case, however, it is necessary to consider the possibility that an abnormality is generated in the surrounding environment recognition sensor 3 due to the effect of the primary collision.

Considering this possibility, based on the situation of an area that is estimated immediately before the collision as an area where a secondary collision will be generated, this embodiment predicts the vehicle surrounding situation immediately after the collision and performs the traveling control for avoiding the secondary collision. In addition, this embodiment predicts the vehicle surrounding situation immediately after a collision according to the sensor state (normal or abnormal) of the surrounding environment recognition sensor 3 and, based on this prediction, performs the traveling control to avoid a secondary collision.

More specifically, in this embodiment, the surrounding situation prediction unit 1*b* predicts the vehicle surrounding situation after the collision detection unit 1*g* detects a collision, based on the situation of the prediction area recorded in the surrounding situation recording unit 1*d* before the collision detection unit 1*g* detects the collision. For the situation of an abnormally recognized area in the vehicle surrounding area corresponding to the detection area, which is before the collision, of the surrounding environment recognition sensor 3 (surrounding situation detection unit) determined by the sensor abnormality determination unit 1*h* as abnormal after the collision detection unit 1*g* detects a collision, the surrounding situation prediction unit 1*b* predicts the situation based on the situation of the prediction area recorded by the surrounding situation recording unit 1*d* before the collision detection unit 1*g* detects the collision. Similarly, for the situation of a normally recognized area in the vehicle surrounding area corresponding to the detection area of the surrounding environment recognition sensor 3 determined by the sensor abnormality determination unit 1*h* as normal, the surrounding situation prediction unit 1*b* predicts the situation based on the detection result of the surrounding environment recognition sensor 3. After the collision detection unit 1*g* detects the collision, the traveling control unit 1*i* performs the traveling control for avoiding the generation of a secondary collision around the vehicle based on the situation of the vehicle surrounding area predicted by the surrounding situation prediction unit 1*b*.

With reference to FIG. 10, the outline of the processing for predicting a secondary collision generation area in this embodiment is described. In FIG. 10, it is assumed that a primary collision is generated when the vehicle 10, which is a host vehicle, passes another preceding vehicle 30 traveling in the same lane and causes a primary collision with another vehicle 20 traveling in the oncoming lane as shown in FIG. 4.

In FIG. 10, at the time M seconds immediately before the collision (that is, when the collision avoidance determination unit 1*f* determines that the primary collision with the vehicle 20 cannot be avoided), the surrounding situation estimation unit 1*c* estimates an area where there will be a surrounding obstacle after N seconds (in FIG. 10, the vehicle 30 with which the secondary collision will be generated). More specifically, after the collision avoidance determination unit 1*f* determines that the collision with the vehicle 20 cannot be avoided as shown in FIG. 5 above, the surrounding situation estimation unit 1*c* estimates the situation of a prediction area, which is an area around the vehicle at the time of collision with the vehicle 20 and in which the generation of the secondary collision with the vehicle 30 is predicted, based on the detection result of the surrounding environment recognition sensor 3 before the collision detection unit 1*g* detects the collision with the vehicle 20. At this time, the surrounding situation recording unit 1*d* sends and records the situation of the prediction area, estimated by the surrounding situation estimation unit 1*c*, to the memory of the ECU 1.

In FIG. 10, the surrounding situation prediction unit 1*b* predicts the situation of the vehicle surrounding area around the vehicle at the time N seconds immediately after the collision (that is, at the time the collision detection unit 1*g* detects the primary collision with the vehicle 20). More specifically, immediately after the collision, the surrounding situation prediction unit 1*b* identifies the position and the tilting state of the vehicle, using not only the surrounding environment information, acquired by the surrounding environment information acquisition unit 1*a*, but also various types of information indicating the vehicle momentum sent from the vehicle momentum detection sensor 2. After that, the surrounding situation prediction unit 1*b* determines the collision position (primary prediction) by applying the identified position and the tilting state of the vehicle to the prediction area recorded in the memory of the ECU 1 at the time M seconds immediately before the collision. In this way, if it is determined that the primary collision cannot be avoided, the primary prediction processing of the surrounding situation prediction unit 1*b* can be performed to predict an area, where the secondary collision will be generated, by using the ECU memory information recorded immediately before the collision.

In addition, at the time N seconds immediately after the collision, the sensor abnormality determination unit 1h determines whether an abnormality is generated in the plurality of surrounding environment recognition sensors 3, installed on the vehicle 10, due to the effect of the primary collision. At this time, for the surrounding environment recognition sensor 3 that is determined as abnormal based on the determination result of the sensor abnormality determination unit 1h (in FIG. 10, sensor 2 that covers the front-right detection area of the vehicle), the surrounding situation prediction unit 1b predicts that the area near the collision position cannot be recognized correctly at the time N seconds immediately after the collision. Therefore, the situation of the abnormally recognized area in the vehicle surrounding area corresponding to the detection area that is set before the collision by the surrounding environment recognition sensor 3 (sensor 2 in FIG. 10) determined by the sensor abnormality determination unit 1h as abnormal after the collision detection unit 1g detects the collision, the surrounding situation prediction unit 1b predicts the situation based on the situation of the prediction area recorded by the surrounding situation recording unit 1d at the time M seconds immediately before the collision. That is, in FIG. 10, the situation of the abnormally recognized area is predicted based on the situation of the prediction area recorded in the ECU memory corresponding to the range of the abnormally recognized area (the part restored from the ECU memory in FIG. 10).

For the surrounding environment recognition sensors 3 determined as normal based on the determination result of the sensor abnormality determination unit 1h (in FIG. 10, sensors 1 and sensors 3 to 6 that cover the detection areas other than the front-right detection area of the vehicle), the surrounding situation prediction unit 1b predicts that the detection areas are normally recognized even at the time N seconds immediately after the collision. Therefore, for the situation of the normally recognized areas in the vehicle surrounding area corresponding to the detection areas of the surrounding environment recognition sensors 3 determined by the sensor abnormality determination unit 1h as normal (sensor 1 and sensors 3 to 6 in FIG. 10), the surrounding situation prediction unit 1b predicts the situation based on the detection result of the surrounding environment recognition sensors 3. Next, the surrounding situation prediction unit 1b combines the situation of the abnormally recognized area, predicted based on the ECU memory information recorded immediately before the collision, with the situation of the normally recognized areas, predicted based on the surrounding environment information detected immediately after the collision, for predicting the situation of the vehicle surrounding area at the time N seconds immediately after the collision.

As described above, the surrounding situation prediction unit 1b performs the above processing as the secondary prediction processing based on the determination result indicating whether there is a sensor abnormality. That is, the surrounding situation prediction unit 1b predicts the vehicle surrounding situation by using the ECU memory information, recorded immediately before a collision, for an area covered by a sensor in which an abnormality is generated after a primary collision, and by using the dejection result, actually detected at the time immediately after the collision, for an area covered by a sensor that is normal even after the primary collision. This processing further increases the prediction accuracy of an area where a secondary collision will be generated.

Figure 11:
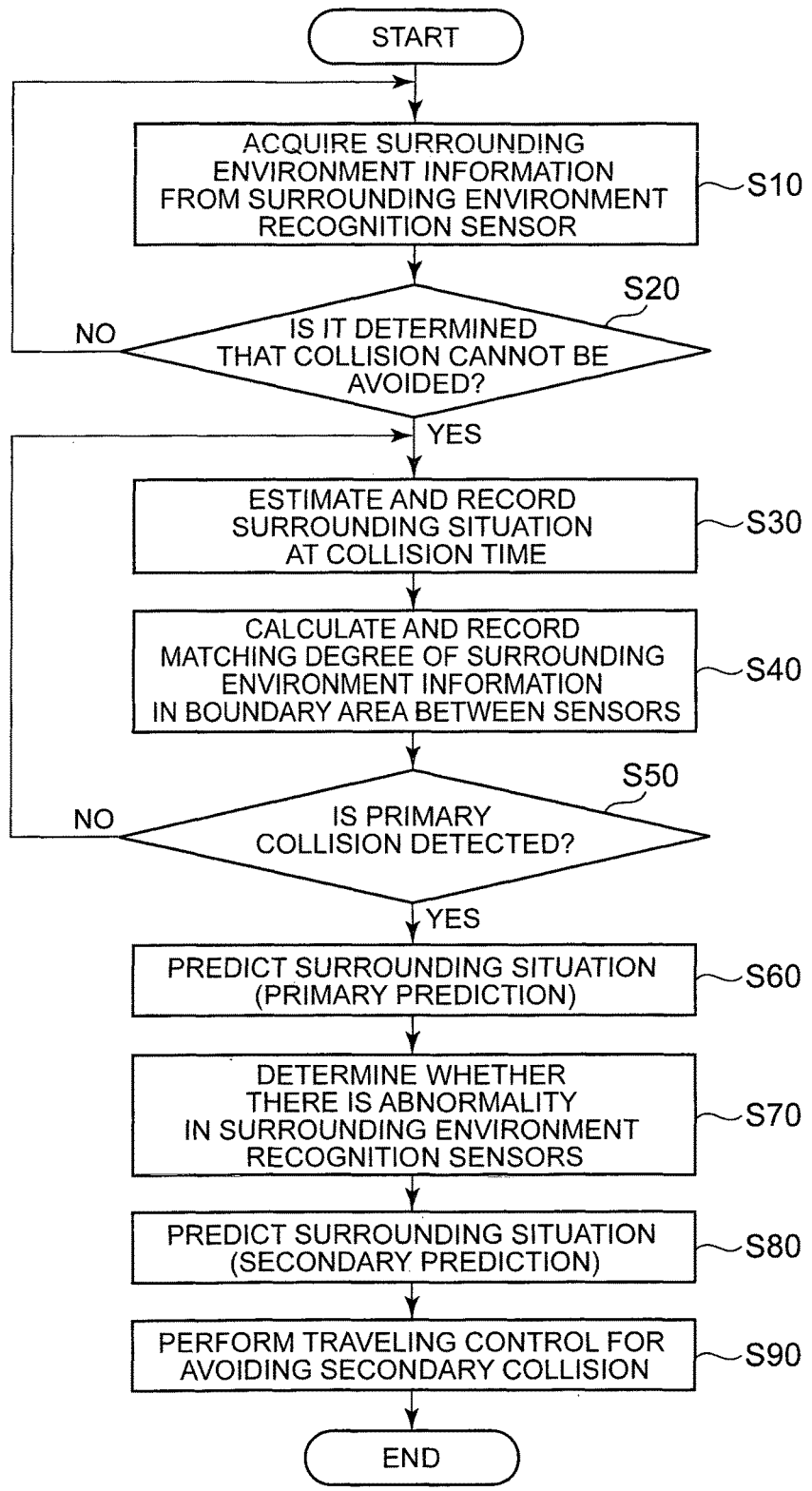
FIG. 11 is a flowchart showing an example of the basic processing of a vehicle surrounding situation estimation device of the present invention.
Figure 12:
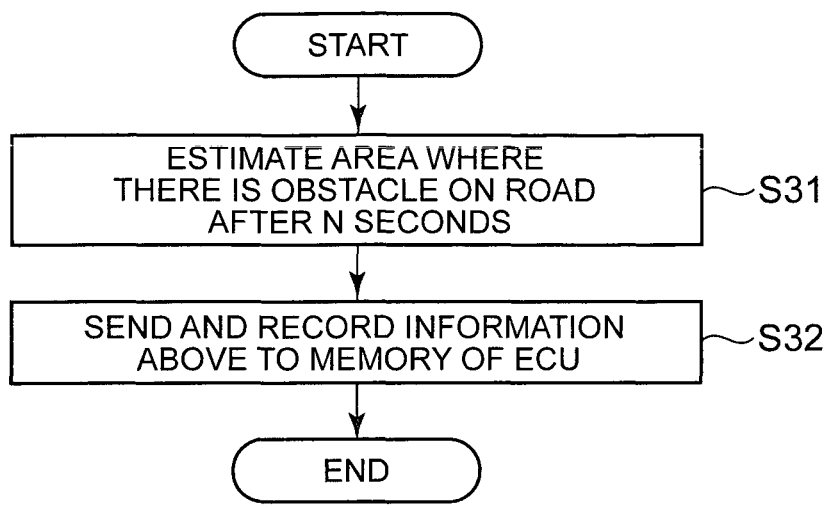
FIG. 12 is a flowchart showing an example of the surrounding situation estimation processing performed immediately before a collision.
Figure 13:
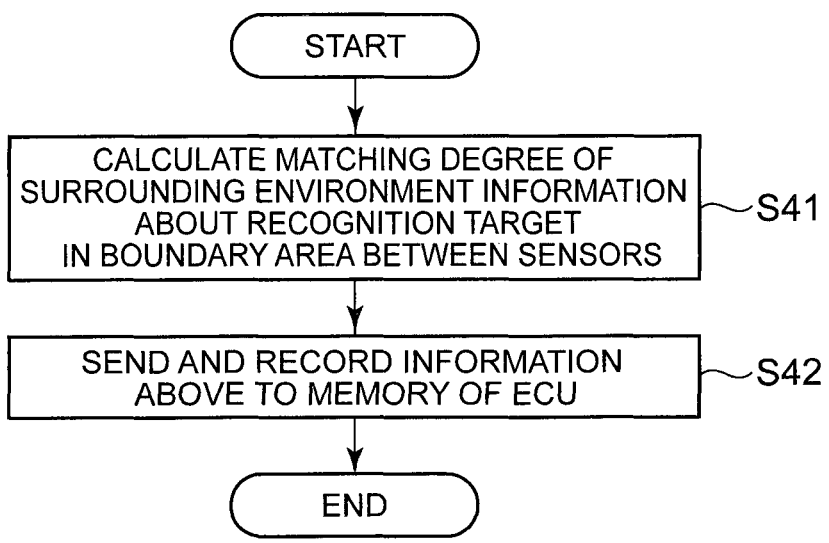
FIG. 13 is a flowchart showing an example of the matching degree recording processing performed immediately before a collision.
Figure 14:
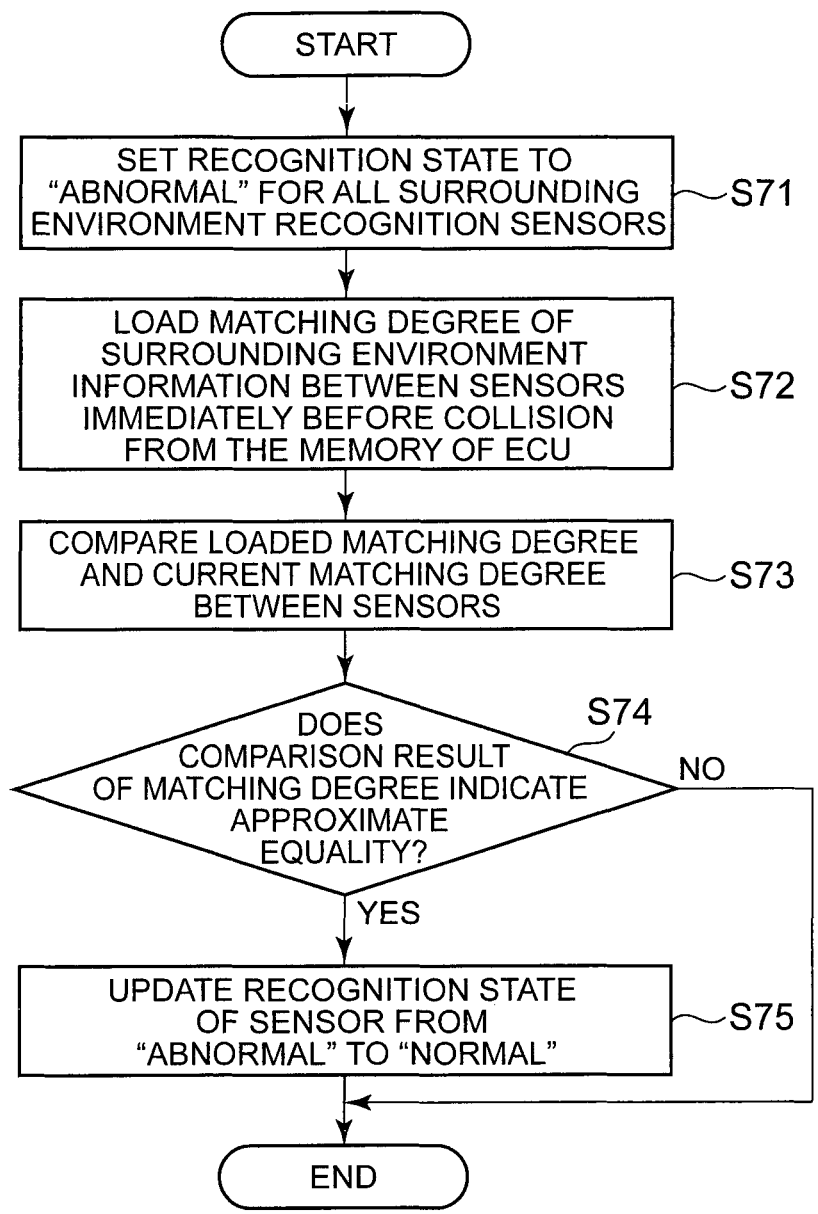
FIG. 14 is a flowchart showing an example of the sensor abnormality determination processing performed immediately after a collision.
Figure 15:
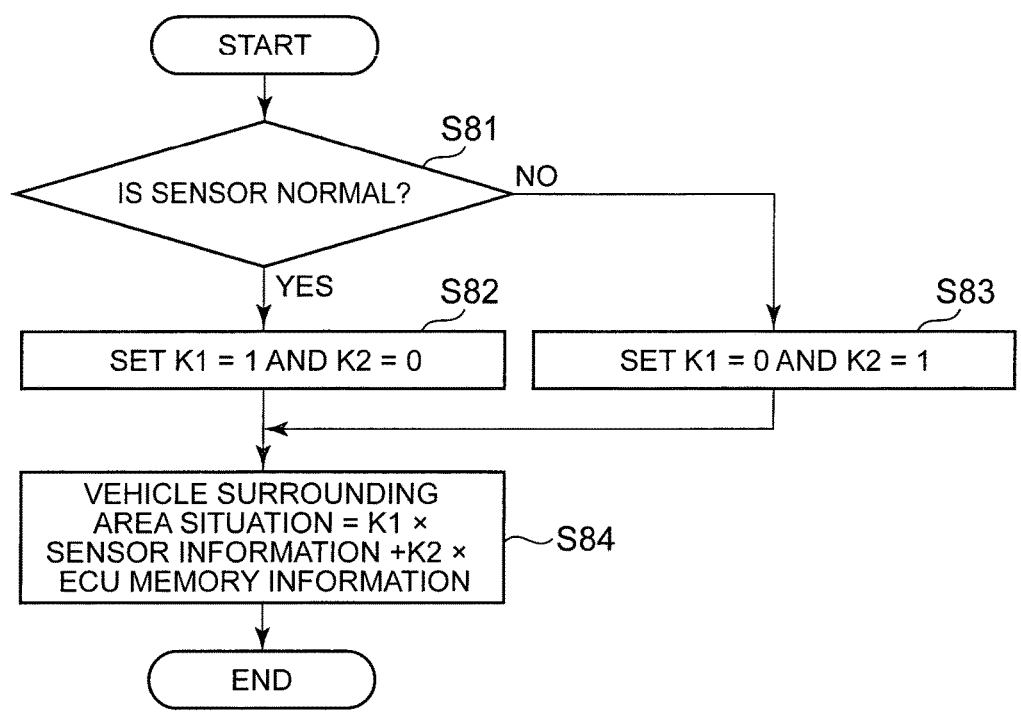
FIG. 15 is a flowchart showing an example of the surrounding situation prediction processing performed according to the sensor state.

Next, with reference to FIG. 11 to FIG. 15, the following describes various types of processing executed by the vehicle surrounding situation estimation device described above. FIG. 11 is a flowchart showing an example of the basic processing of a vehicle surrounding situation estimation device of the present invention. FIG. 12 is a flowchart showing an example of the surrounding situation estimation processing performed immediately before a collision. FIG. 13 is a flowchart showing an example of the matching degree recording processing performed immediately before a collision. FIG. 14 is a flowchart showing an example of the sensor abnormality determination processing performed immediately after a collision. FIG. 15 is a flowchart showing an, example of the surrounding situation prediction processing performed according to the sensor state.

As shown in FIG. 11, the surrounding environment information acquisition unit 1a receives and acquires surrounding environment information sent from the surrounding environment recognition sensor 3 and indicating the vehicle surrounding situation such as a moving object or a stationary obstacle around the vehicle (step S10).

The collision avoidance determination unit 1f determines whether collision between the vehicle 10 and an object outside the vehicle can be avoided, based on the various types of information received from the vehicle momentum detection sensor 2 and indicating the vehicle momentum and on the surrounding environment information acquired by the surrounding environment information acquisition, unit 1a in step S10 (step S20). In this embodiment, the collision avoidance determination unit 1f calculates the time to collision between an object outside the vehicle and the vehicle 10 (the so-called a collision prediction time (Tome-To-Collision: TTC)), for example, based on the relative position and the relative speed between the object outside the vehicle and the vehicle 10 indicated by the surrounding environment information and on the vehicle speed and the acceleration of the vehicle 10 included in the information indicating the vehicle momentum. After that, the collision avoidance determination unit 1f determines that collision can be avoided if the calculated TTC is equal to or larger than a predetermined threshold and that collision cannot be avoided if the calculated TTC is smaller than the predetermined threshold.

In step S20, the collision avoidance determination unit 1f proceeds to the processing in the next step, S30, if it determines that collision cannot be avoided (step S20: Yes), and to the processing in step S10 if it determines that collision can be avoided (step S20: No).

If the collision avoidance determination unit 1f determines in step S20 that collision cannot be avoided (step S20: Yes), the surrounding situation estimation unit 1c and the surrounding situation, recording unit 1d estimate and record the surrounding situation at collision time (step S30). The surrounding situation estimation processing performed immediately before the collision in step S30 in FIG. 11 is described below with reference to FIG. 12.

As shown in FIG. 12, the surrounding situation estimation unit 1c estimates an area where there is an obstacle on the road at the time N seconds immediately after the collision (step S31). In step S31, based on the surrounding environment information acquired by the surrounding environment information acquisition unit 1a before the collision detection unit 1g detects the collision, the surrounding situation estimation unit 1c estimates the situation of a prediction area where the generation of a secondary collision is predicted around the vehicle at the collision time, as shown in FIG. 5 and FIG. 10. After that, the surrounding situation recording unit 1d sends and records the situation of the prediction area estimated in step S31, in association with the estimation time, to the memory in the ECU 1 (step S32). After that, the processing proceeds to step S40 in FIG. 11.

Returning to FIG. 11, the matching degree recording unit 1e calculates and records the matching degree of the surrounding environment information in a boundary area between the sensors at the time immediately before the collision (step S40). At this time, if the collision avoidance determination unit 1f has determined that collision cannot be avoided (step S20: Yes), the time to collision FTC is determined as a value smaller than the predetermined threshold and the processing described above is performed at the time immediately before the collision. The matching degree recording processing performed in step S40 in FIG. 11 is described below with reference to FIG. 13.

As shown in FIG. 13, the matching degree recording unit 1e calculates the matching degree of the surrounding environment information, which includes the intensity, brightness, color, and relative position of a recognition target (for example, an obstacle determined as unavoidable), in the boundary area between the sensors (step S41). The matching degree recording unit 1e calculates the matching degree of the surrounding environment information in an overlapping area of the surrounding environment recognition sensor 3 when the collision avoidance determination unit 1f determines that collision cannot be avoided (that is, at the time immediately before collision), as shown in FIG. 7 described above. The matching degree recording unit 1e sends and records the matching degree calculated in step S41, in association with the calculation time, to the memory of the ECU 1 (step S42). After that, the processing proceeds to step S50 in FIG. 11.

Returning to FIG. 11, if the collision detection unit 1g detects a primary collision between the vehicle 10 and the obstacle in step S50 (step S50: Yes), the processing proceeds to the processing in the next step S60. If the collision detection unit 1g does not detect a primary collision between the vehicle 10 and the obstacle (step S50: No), the processing is repeated from step S30 until a primary collision is detected. By repeating the processing from step S30, the surrounding situation recording unit 1d records the situation of the prediction area, estimated by the surrounding situation estimation unit 1c, from the time the collision avoidance determination unit 1f determines that collision cannot be avoided to the time the collision detection unit 1g detects the collision.

If the collision detection unit 1g detects a primary collision in step S50 (step S50: Yes), the surrounding situation prediction unit 1b predicts the situation of the vehicle surrounding area around the vehicle based on the situation of the prediction area recorded by the surrounding situation recording unit 1d before the collision detection unit 1g detects the primary collision (step S60). For example, as the primary prediction processing, the surrounding situation prediction unit 1b predicts the situation of the vehicle surrounding area around the vehicle at the time N seconds immediately after the collision (that is, when the collision detection unit 1g detects the primary collision with the vehicle 20) as shown in FIG. 10 above. More specifically, immediately after the collision, the surrounding situation prediction unit 1b identifies the position and the tilting state of the vehicle; using not only the surrounding environment information, acquired by the surrounding environment information acquisition unit 1a, but also various types of information indicating the vehicle momentum sent from the vehicle momentum detection sensor 2. After that, the surrounding situation prediction unit 1b determines the collision position by applying the identified position and the tilting state of the vehicle to the prediction area recorded in the memory of the ECU 1 at the time M seconds immediately before the collision. After that, the processing proceeds to the processing in step S70.

After the collision detection unit 1g detects the collision in step S50, the sensor abnormality determination unit 1h determines whether there is an abnormality in the plurality of surrounding environment recognition sensors 3 mounted on the vehicle (step S70). In step S70, the sensor abnormality determination unit 1h determines whether there is an abnormality in the first sensor that detects the situation of the first area around the vehicle 10 and in the second sensor that detects the situation of the second area around the vehicle 10 that is different from the first area and that partially overlaps with the first area. The sensor abnormality determination processing, performed in step S70 in FIG. 11, is described below with reference to FIG. 14.

As shown in FIG. 14, if the collision detection unit 1g has detected a collision in step S50 in FIG. 11 (step S50: Yes), the sensor abnormality determination unit 1h sets the recognition state "abnormal" for all surrounding environment recognition sensors 3 mounted on the vehicle 10 (step S71). At this time, if the collision detection unit 1g has detected a collision (step S50: Yes), the processing described above is performed immediately after the collision. Therefore, in step S71 in FIG. 14, the matching degree recording unit 1e also calculates and records the matching degree of the surrounding environment information in the boundary area between the sensors at the time immediately after the collision as described above. After that, the sensor abnormality determination unit 1h loads the matching degree of the surrounding environment information, recorded by the matching degree recording unit 1e at the time immediately before the collision in step S42 in FIG. 13, from the memory of the ECU 1 (step S72). Then, the sensor abnormality determination unit 1h compares the matching degree of the surrounding environment information about the vehicle 20 at the time immediately before the collision, which is loaded in step S72, with the matching degree of the surrounding environment information recorded by the matching degree recording unit 1e at the time immediately after the collision in step S71 (step S73).

Based on the comparison result produced by the processing in step S73, the sensor abnormality determination unit 1h determines whether the matching degree in the overlapping area between the sensors immediately before the collision is approximately equal to the matching degree in the overlapping area between the sensors immediately after the collision (step S74). The determination processing in step S74 is performed for each pair of sensors that has a boundary area.

If it is determined in step S74 that the comparison result of the matching degrees indicates an approximate equality. (step S74: Yes), the sensor abnormality determination unit 1h updates the recognition state of the corresponding surrounding environment recognition sensor 3 from "abnormal" to "normal. After that, the processing proceeds to the processing in step S80 in FIG. 11. On the other hand, if it is determined in step S74 that the comparison result of the matching degrees does not indicate an approximate equality (step S74: No), the recognition state of the corresponding surrounding environment recognition sensor 3 is not updated to "normal" but is left as "abnormal". After that, the processing proceeds to step S80 in FIG. 11.

Returning to FIG. 11, the surrounding situation prediction unit 1b predicts the situation of the vehicle surrounding area around the vehicle by adding a correction to the prediction result, predicted by the primary prediction in step S60, according to the determination result of the sensor abnormality determination unit 1h (step S80). In step S80, for the situation of the abnormally recognized area in the vehicle surrounding area corresponding to the detection area, which is set before the collision, of the surrounding environment recognition sensor 3 (surrounding situation detection unit) determined by the sensor abnormality determination unit 1h as abnormal after the collision detection unit 1g detects a collision, the surrounding situation prediction unit 1b predicts the situation based on the situation of the prediction area recorded by the surrounding situation recording unit 1d before the collision detection unit 1g detects the collision. Similarly, for the situation of the normally recognized area in the vehicle surrounding area corresponding to the detection area of the surrounding environment recognition sensor 3 determined by the sensor abnormality determination unit 1h as normal, the surrounding situation prediction unit 1b predicts the situation based on the detection result of the surrounding environment recognition sensor 3. For example, as shown in FIG. 10, the surrounding situation prediction unit 1b performs the secondary prediction processing based on the determination result of the sensor abnormality determination unit 1h at the time N seconds immediately after the collision; more specifically, the surrounding situation prediction unit 1b combines the situation of the abnormally recognized area, predicted based on the ECU memory information recorded immediately before the collision, with the situation of the normally recognized areas, predicted based on the surrounding environment information detected immediately after the collision, for predicting the situation of the vehicle surrounding area at the time N seconds immediately after the collision. The surrounding situation prediction processing according to the sensor state, performed in step S80 in FIG. 11, is described below with reference to FIG. 15.

As shown in FIG. 15, based on the determination result of the sensor abnormality determination unit 1h, the surrounding situation prediction unit 1b determines whether the recognition state of each of the plurality of surrounding environment recognition sensors 3, mounted on the vehicle 10, is "normal" (step S81).

If it is determined in step S81 that the recognition state of the target surrounding environment recognition sensor 3 is "normal" (step S81: Yes), the surrounding situation prediction unit 1b sets up the processing in such a way that, for the normally recognized area in the vehicle surrounding area corresponding to the detection area of the surrounding environment recognition sensor 3 determined as "normal", the detection result, detected by the surrounding environment recognition sensor 3 at the time immediately after the collision, is used (step S82). More specifically, in step S82, the surrounding situation prediction unit 1b sets the value of the sensor-information usage weighting factor K1 to 1, and the value of the ECU-memory-information usage weighting factor K2 to 0. After that, the processing proceeds to the processing in step S84.

On the other hand, if it is determined in step S81 that the recognition state of the target surrounding environment recognition sensor 3 is "abnormal" (step S81: No), the surrounding situation prediction unit 1b sets up the processing in such a way that, for the abnormally recognized area in the vehicle surrounding area corresponding to the detection area of the surrounding environment recognition sensor 3 determined as "abnormal", the information on the area, stored in the memory of the ECU 1, is used (step S83). More specifically, in step S83, the surrounding situation prediction unit 1b sets the value of the sensor-information usage weighting factor K1 to 0, and the value of the ECU-memory-information usage weighting factor K2 to 1. After that, the processing proceeds to the processing in step S84.

After that, the surrounding situation prediction unit 1b substitutes the value of the sensor-information usage weighting factor K1 and the value of the ECU-memory-information usage weighting factor K2, which are set in step S82 and step S83, into the expression "vehicle surrounding area situation=K1×sensor information+K2×ECU memory information". This allows the surrounding situation prediction unit 1b to combine the situation of the abnormally recognized area, predicted based on the ECU memory information recorded immediately before the collision, with the situation of the normally recognized area, predicted based on the surrounding environment information detected immediately after the collision, to predict the vehicle surrounding area situation immediately after the collision (step S84). After that, the processing proceeds to the processing in step S80 in FIG. 11.

Returning to FIG. 11, the traveling control unit 1i performs the traveling control for avoiding the generation of a secondary collision around the vehicle based on the vehicle surrounding area situation predicted in step S80 (step S90).

Figure 16:
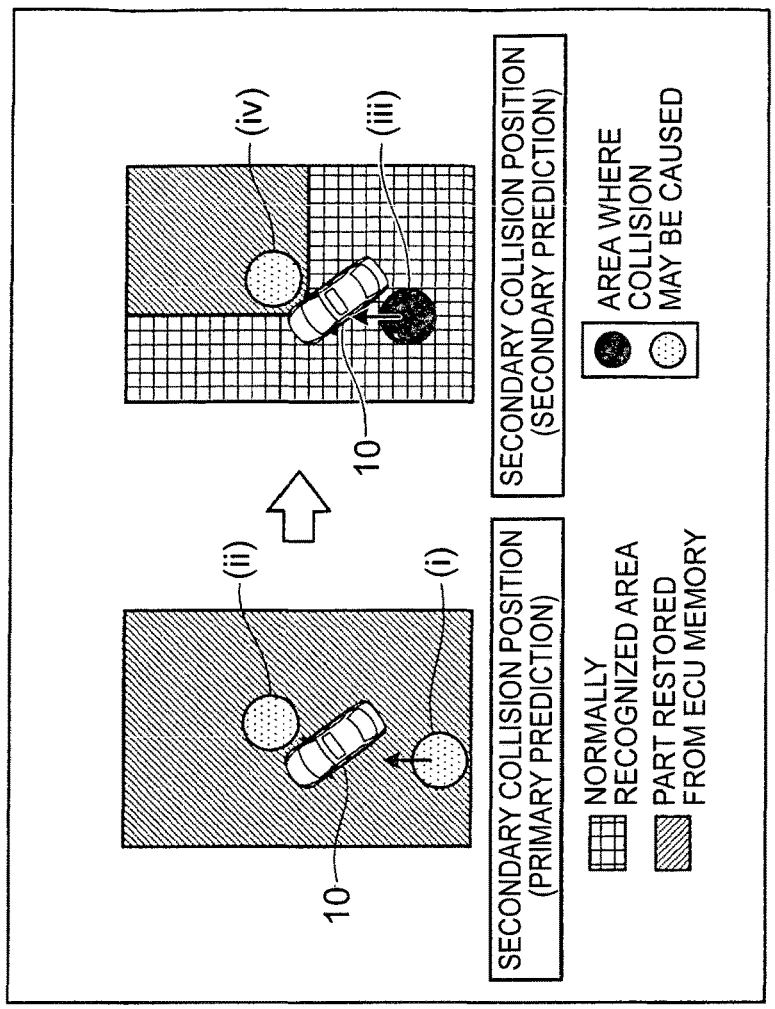
FIG. 16 is a diagram showing an example of a scene in which a secondary collision position for a moving object on a road is predicted.
Figure 16:
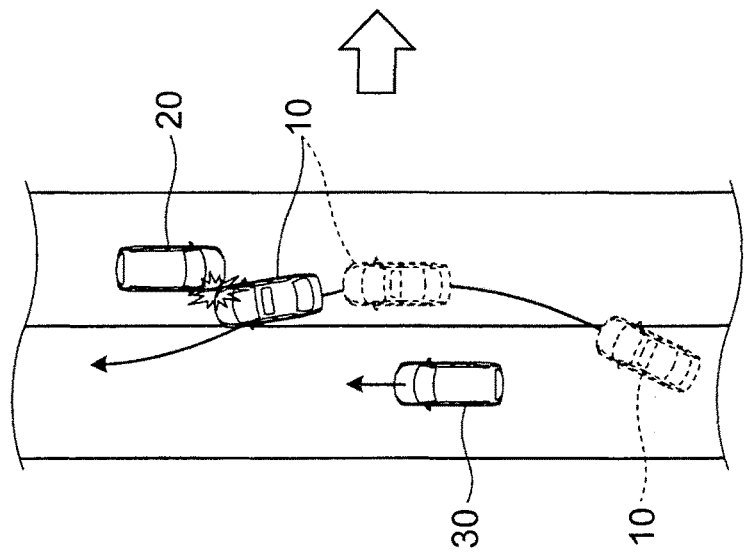
Figure 17:
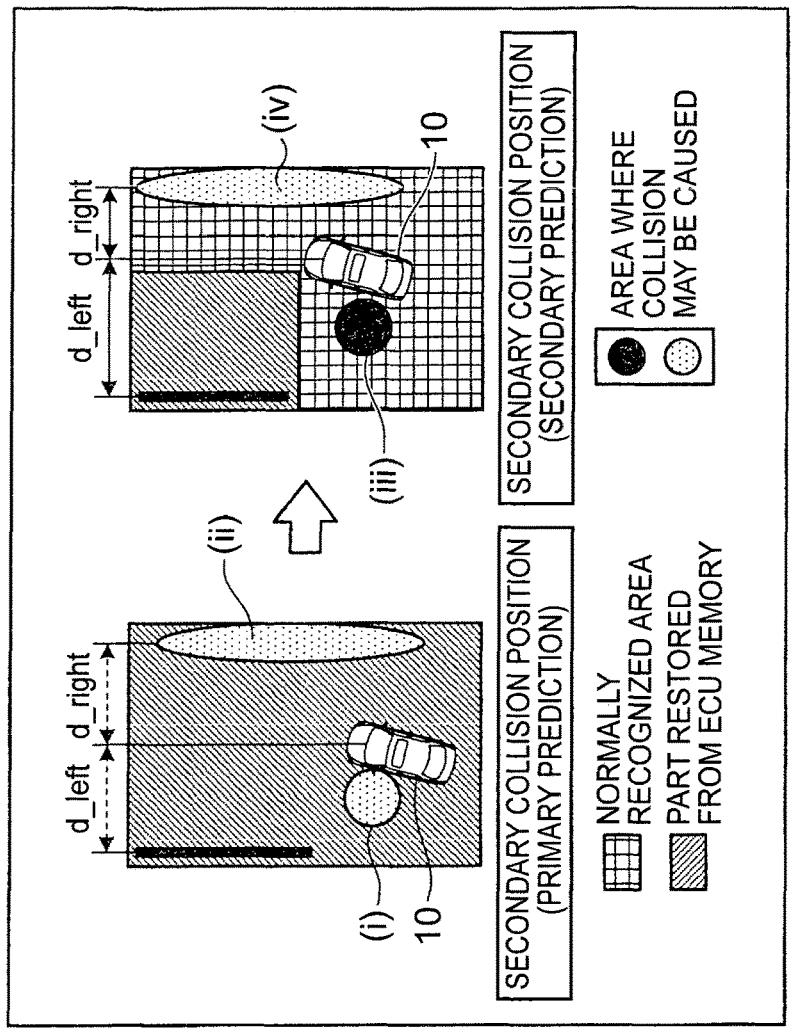
FIG. 17 is a diagram showing an example of a scene in which a secondary collision position for a stationary object on a road is predicted.
Figure 17:
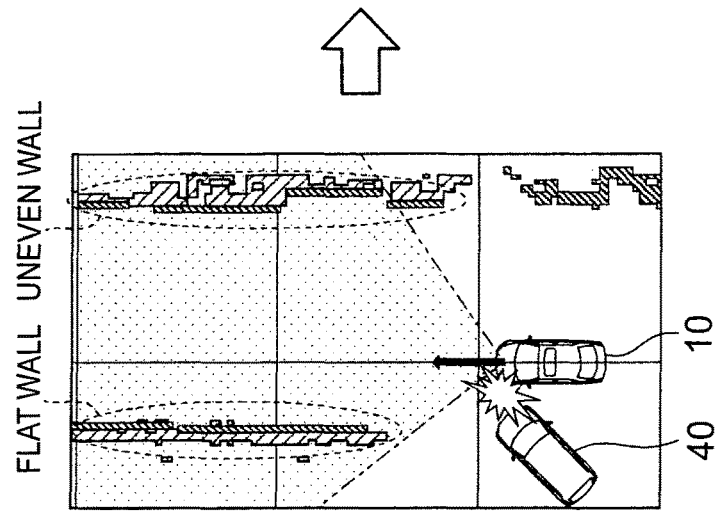

As described above, the vehicle surrounding situation estimation device in this embodiment can suitably estimate the vehicle surrounding situation even when a sensor abnormality is generated by a collision and, as a result, the surrounding situation cannot be detected, as shown in FIG. 16 and FIG. 17. FIG. 16 is a diagram showing an example of a scene in which a secondary collision position for a moving object on a road is predicted. FIG. 17 is a diagram showing an example of a scene in which a secondary collision position for a stationary object on a road, is predicted.

The left-hand figure in FIG. 16 shows a scene in which the vehicle 10, a host vehicle, passes another preceding vehicle 30 traveling in the same lane and causes a primary collision with another vehicle 20 traveling in the oncoming lane. In FIG. 16, it is assumed that, when the vehicle 10 passes the vehicle 30, the front-right portion of vehicle 10 collides with the vehicle 20 and, as a result, an abnormality is generated in the surrounding environment recognition sensor 3 (for example, sensor 2) mounted in the front-right portion of the vehicle. In this situation, the processing of the sensor abnormality determination unit 1h in this embodiment determines that the recognition state of the surrounding environment recognition sensor 3 mounted in the front-right portion (for example, sensor 2) is abnormal. The processing of the sensor abnormality determination unit 1h also determines that the recognition state of the surrounding environment recognition sensors 3 (for example, sensor 1 and sensors 3 to 6), mounted in the positions other than the front-right portion of the vehicle, is normal. Next, as the primary prediction result of the secondary collision position, the processing of the surrounding situation prediction unit 1b predicts the position and the tilting state of the vehicle 10 after the collision with the vehicle 20, as shown in the right-hand figure in FIG. 16, based on the information on the yaw rate and the acceleration and predicts the position of approach with the vehicle 30, which is a following vehicle with which a secondary collision will be caused, based on the ECU memory information recorded immediately before the collision. In addition, as the secondary prediction result of the secondary collision position, the processing of the surrounding situation prediction unit 1b switches the sensor (for example, sensor 5), which covers the rear-left portion determined as "normal", to the actual sensing information to determine the actual distance to the vehicle 30.

The left-hand figure in FIG. 17 shows a scene in which, while the vehicle 10, a host vehicle, is traveling in a lane where there is a flat wall on the left side and an uneven wall on the right side, a vehicle 40 causes a primary collision with the front-left portion of the vehicle 10. In FIG. 17, it is assumed that, at the time of collision with the vehicle 40, an abnormality is generated in the surrounding environment recognition sensor 3 (for example, sensor 3) mounted in the front-left portion of the vehicle 10. In this situation, the processing of the sensor abnormality determination unit 1h in this embodiment determines that the recognition state of the surrounding environment recognition sensor 3 mounted in the front-left portion (for example, sensor 3) is abnormal. The processing of the sensor abnormality determination unit 1h also determines that the recognition state of the surrounding environment recognition sensors 3 (for example, sensors 1 to 2 and sensors 4 to 6), mounted in the positions other than the front-left portion of the vehicle, is normal. Next, as the primary prediction result of the secondary collision position, the processing of the surrounding situation prediction unit 1b predicts the position and the tilting state of the vehicle 10 after the collision with the vehicle 40, as shown in the right-hand figure in FIG. 17, based on the information on the yaw rate and the acceleration, and predicts the distance to the uneven wall on the right side with which the secondary collision will be caused, based on the ECU memory information, including the information on the road width, recorded immediately before the collision. In addition, as the secondary prediction result of the secondary collision position, the processing of the surrounding situation prediction unit 1b switches the sensor 2, which covers the front-right portion determined as "normal", to the actual sensing information to determine the actual distance to the uneven wall on the right side (d_right in FIG. 17). In addition, by also using the information on the road width, the processing of the surrounding situation prediction unit 1b determines the actual distance to the flat wall on the left side (d_left in FIG. 17).

In FIG. 16 and FIG. 17, comparison between the primary prediction result of the secondary collision position and the secondary prediction result of the secondary collusion position indicates that, out of areas (i) to (iv) where collision may be caused, the area (i), indicated by the primary prediction result, and the area (iii) indicated by the secondary prediction result, differ in position. This indicates that, for an area covered by a sensor determined as normal after the collision, the situation of the vehicle surrounding area can be predicted more suitably by switching to the actual sensing information than by using the ECU memory information recorded immediately before the collision. As described above, according to this embodiment, the vehicle surrounding situation can be suitably estimated even when a sensor abnormality is generated by a collision and, as a result, the surrounding situation cannot be detected.

In the above embodiment, the example is described in which the matching degree recording unit 1e calculates and records the matching degree of the surrounding environment information in an overlapping area of the surrounding environment recognition sensors 3 at the time immediately before a collision (that is, when the collision avoidance determination unit 1f determines that collision cannot be avoided) or at the time immediately after a collision (that is, when the collision detection unit 1g detects a collision). Instead of this, the matching degree recording unit 1e may calculate and record the matching degree of the surrounding environment information in an overlapping area of the surrounding environment recognition sensors 3 at a predetermined time before a collision (for example, when the engine is started or the steering support switch is turned on). This allows the sensor abnormality determination unit 1h to confirm that there is no abnormality in the sensors, mounted on the vehicle 10, before the matching degrees in an overlapping area are compared between the sensors immediately before and immediately after a collision.

Although the example is described in the above embodiment in which the traveling control unit 1i performs the traveling control (for example, steering control or brake control) for avoiding the generation of a secondary collision around the vehicle, the processing contents of the traveling control unit 1i are not limited to this processing. For example, the processing of the surrounding situation estimation unit 1c in this embodiment can estimate the position of a white line as the situation of the prediction area around the vehicle at collision time. This allows the processing of the surrounding situation prediction unit 1b to estimate a travelable area, determined by a while line around the vehicle, even after the detection of a collision based on the situation of the prediction area that includes the position of a while line recorded before the collision is detected. This in turn allows the processing of the traveling control unit 1i to perform the traveling control (the so-called Lane Keeping Assist: LKA), which controls the behavior of the vehicle so that the vehicle follows a white line, even after the detection of a collision. In this way, the vehicle surrounding situation estimation device in this embodiment can suitably predict a travelable area, determined by a white line, even after a primary collision, thus making it possible to perform the LKA control even when sensor abnormality is generated by a collision and the surrounding situation cannot be detected. Therefore, the LKA control, which is performed even after a primary collision, reduces the possibility that the vehicle will run out of the current lane after a collision, thereby reducing the generation of a secondary collision with another vehicle running in another lane or a secondary collision with an obstacle beside the lane.

The invention claimed is:

1. A vehicle surrounding situation estimation device comprising:
   sensors configured to detect a surrounding environment outside a vehicle; and
   an electronic control unit (ECU) programmed to:
   determine that the vehicle will collide with a first object outside the vehicle;
   estimate a position of a second object outside the vehicle at a collision time based on a detection result of the sensors obtained before the collision;
   record the position of the second object outside the vehicle that has been estimated;
   after the collision is detected, determine whether there is damage to the sensors mounted on the vehicle;
   estimate a position of the second object outside the vehicle in a vehicle surrounding area around the vehicle after the collision has been detected using, (i) from the sensors that are determined to be damaged after the collision, the position of the second object outside the vehicle, which was recorded before the detection of the collision, and (ii) from the sensors that are determined as normal by the ECU after the collision has been detected, a current detection result; and
   perform traveling control for controlling a behavior of the vehicle based on the position of the second object outside the vehicle surrounding area that has been determined after the collision has been detected.

2. The vehicle surrounding situation estimation device according to claim 1, wherein the ECU is further programmed to:
   determine whether the collision between the vehicle and the first object outside the vehicle can be avoided, the first object outside the vehicle being detected by the sensors; and
   determine the current position of the second object outside the vehicle after the determination that the collision cannot be avoided, and
   record the position of the second object outside the vehicle that has been estimated from a time of the determination that the collision cannot be avoided to a time of the detection of the collision.

3. The vehicle surrounding situation estimation device according to claim 1, wherein the ECU is further programmed to:
   estimate the position of the second object outside the vehicle in such a way that, for a situation of an abnormally recognized area in the vehicle surrounding area corresponding to a detection area, which is set before the collision, of the sensors determined as damaged after the detection of the collision, estimate the position of the second object outside the vehicle based on the position of the second object outside the vehicle that has been recorded before the detection of the collision and, for a situation of a normally recognized area in the vehicle surrounding area corresponding to a detection area of the sensors determined as normal, predict the position of the second object outside the vehicle based on the detection result of the sensors.

* * * * *